(12) United States Patent
Obata et al.

(10) Patent No.: US 8,865,242 B2
(45) Date of Patent: Oct. 21, 2014

(54) CELLULOSE COMPOSITE

(75) Inventors: Haruko Obata, Tokyo (JP); Naoaki Yamasaki, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 19 days.

(21) Appl. No.: 13/637,743

(22) PCT Filed: Mar. 30, 2011

(86) PCT No.: PCT/JP2011/058020
§ 371 (c)(1),
(2), (4) Date: Sep. 27, 2012

(87) PCT Pub. No.: WO2011/125742
PCT Pub. Date: Oct. 13, 2011

(65) Prior Publication Data
US 2013/0022730 A1 Jan. 24, 2013

(30) Foreign Application Priority Data
Mar. 31, 2010 (JP) ................. 2010-082373

(51) Int. Cl.
*A23L 1/0534* (2006.01)
*A23L 1/054* (2006.01)
*C08L 5/00* (2006.01)
*A23L 2/52* (2006.01)
*A23L 1/22* (2006.01)
*A23L 1/053* (2006.01)
*C08L 1/02* (2006.01)
*A23L 2/02* (2006.01)

(52) U.S. Cl.
CPC ... *A23L 2/02* (2013.01); *C08L 5/00* (2013.01); *A23L 2/52* (2013.01); *A23L 1/22* (2013.01); *A23L 1/054* (2013.01); *A23L 1/053* (2013.01); *C08L 1/02* (2013.01); *A23L 1/0534* (2013.01)
USPC ............................ 426/573; 426/580; 426/599

(58) Field of Classification Search
CPC .... A23L 1/0534; A23L 2/02; A23V 2300/28; C08L 1/02; C08L 1/22
USPC ......................................... 426/573, 599, 580
See application file for complete search history.

(56) References Cited

U.S. PATENT DOCUMENTS

| | | | | |
|---|---|---|---|---|
| 5,415,804 A | * | 5/1995 | Minami et al. | 252/363.5 |
| 6,117,474 A | * | 9/2000 | Kamada et al. | 426/590 |
| 2008/0107789 A1 | | 5/2008 | Akimoto | |

FOREIGN PATENT DOCUMENTS

| | | |
|---|---|---|
| CN | 101098632 A | 1/2008 |
| CN | 101505605 A | 8/2009 |
| JP | 6335365 | 12/1994 |
| JP | 7102113 | 4/1995 |
| JP | 7268129 | 10/1995 |

(Continued)

OTHER PUBLICATIONS

Search report from International Application No. PCT/JP2011/058020, mail date is Jul. 12, 2011.

(Continued)

*Primary Examiner* — Helen F Heggestad
(74) *Attorney, Agent, or Firm* — Greenblum & Bernstein, P.L.C.

(57) ABSTRACT

Disclosed is a cellulose composite which comprises cellulose and a hydrophilic gum, the cellulose composite giving a 1-mass % aqueous dispersion thereof which has a storage modulus (G') of 0.06 Pa or more when the pH thereof is 4.

2 Claims, 2 Drawing Sheets

(56) References Cited

FOREIGN PATENT DOCUMENTS

| | | |
|---|---|---|
| JP | 9003243 | 1/1997 |
| JP | 9206000 | 8/1997 |
| JP | 9278674 | 10/1997 |
| JP | 2008048604 | 3/2006 |
| JP | 2009291081 | 12/2009 |
| WO | 2006/062089 A1 | 6/2006 |
| WO | 2009/151018 A1 | 12/2009 |

OTHER PUBLICATIONS

Food Chemistry, pp. 81-82, 1999.
Chinese Office Action and Search Report issued with respect to Chinese Application No. 201180014808.X, mail date is Jan. 24, 2014.

* cited by examiner

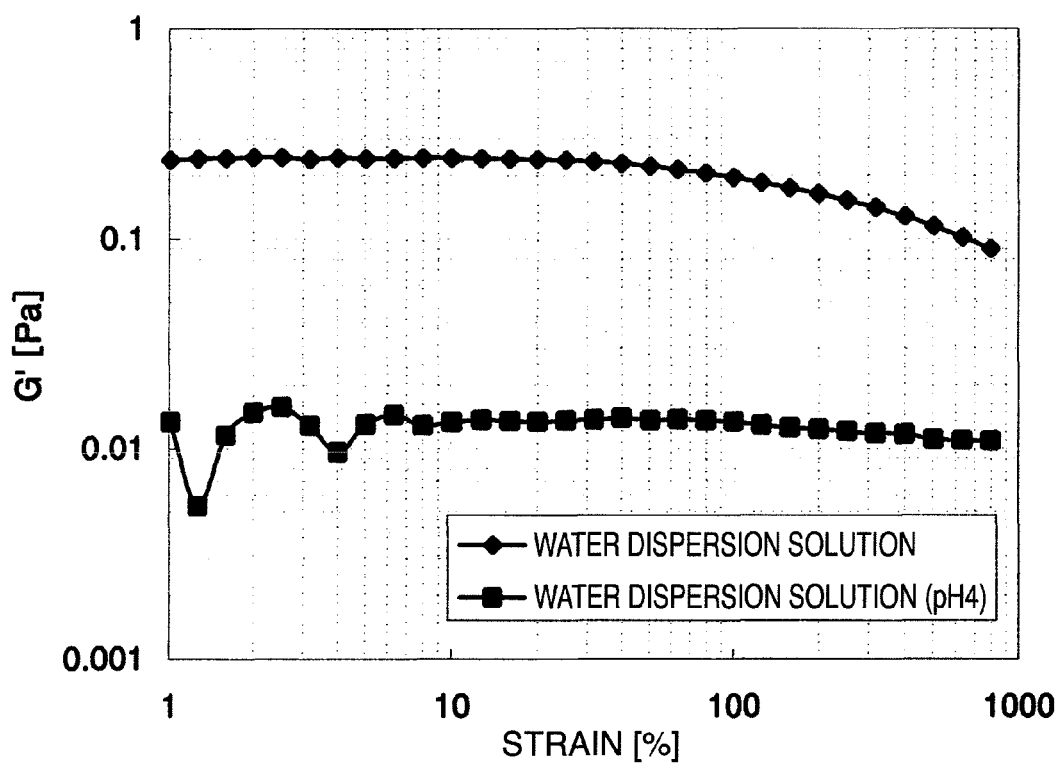

CELLULOSE COMPOSITE

TECHNICAL FIELD

The present invention relates to a cellulose composite showing a stable dispersion state and suspension state when it is dispersed in acidic or high salt concentration water.

BACKGROUND ART

A cellulose composite of cellulose and a hydrophilic gum has been conventionally known to form cellulose colloid in an aqueous medium and show satisfactory suspension stability and is widely used in the fields of e.g., foods, medical products, cosmetics, paints, ceramics, resins, catalysts and other industrial products. Particularly, a cellulose composite is used, e.g., as a stabilizer such as a suspension stabilizer, an emulsification stabilizer and a thickening stabilizer, a texture imparting agent, a clouding agent, a whitening improver, a flowability improver, a polisher, an alternate material for a dietary fiber and a fat and oil. For example, in a beverage, e.g., calcium enriched milk, a cellulose composite is added for stabilizing suspension of high-gravity water-insoluble components like milk calcium and calcium carbonate.

To improve the suspension-stabilizing effect of a cellulose composite, various studies have been made.

Patent Literature 1 JP 7102113 A, discloses a water dispersible composite containing micro cellulose and carboxymethylcellulose sodium.

Patent Literature 2 JP 6335365 A, discloses a food composition containing a water dispersible composite formed of micro cellulose and carboxymethylcellulose sodium.

However, the cellulose composites described in Patent Literatures 1 and 2 had a problem in that the dispersion stabilizing performance in the presence of an acid and/or a salt is not sufficient, with the result that separation and aggregation occur when the cellulose composite is used in fruit juice beverages, lactobacillus beverages or liquid seasonings.

Patent Literature 3 JP 9003243 A, discloses a water dispersible composition containing micro cellulose and a specific carboxymethylcellulose sodium and a food composition containing the water dispersible composition. The water dispersible composition is described to show excellent suspension stability and emulsion stability under an acidic environment.

In the water dispersible composition described in Patent Literature 3, micro cellulose itself has satisfactory dispersion stability in fruit juice beverages, acidic beverages such as a lactobacillus beverage and salt-containing aqueous compositions such as seasonings including sauce and mop sauce. However, the water dispersible composition had a problem in that long-term storage stability, furthermore, suspension stability when a water-insoluble component such as a functional food material was added were insufficient, causing sedimentation and aggregation.

Patent Literature 4 JP 2008048604 A, describes a stabilizer containing water dispersible cellulose and a polysaccharide. Since the stabilizer contains micro fibrous cellulose stably suspended in water, it serves for fixing particles in an acidic or high salt concentration food and drink such as yogurt, fruit sauce and dressing, contributing to providing commercial products having good appearance. However, the micro fibrous cellulose described in Patent Literature 4 is formed of cellulose and psyllium seed gum in combination. This is not a composite and thus suspension stability was insufficient.

Patent Literature 5 JP 2009291081 A, describes a bacterial cellulose composite. The Patent Literature describes that the bacterial cellulose composite is used in various types of milk-containing beverages and stable acidic milk beverages can be produced since it is excellent in dispersion stability and suspension stability. The bacterial cellulose described in Patent Literature 5 has an extremely thin and long shape and thus the storage elastic modulus (G') of a water dispersion becomes excessively high. As a result, it caused a problem that the texture (feeling in the throat) of a food and drink containing the bacterial cellulose becomes heavy. In addition, if the additive amount of the bacterial cellulose is reduced to control texture, a problem of aggregation with a component of a food and drink has occurred.

PRIOR ART

Patent Literature

Patent Literature 1: JP 7102113 A
Patent Literature 2: JP 6335365 A
Patent Literature 3: JP 9003243 A
Patent Literature 4: JP 2008048604 A
Patent Literature 5: JP 2009291081 A

SUMMARY OF INVENTION

Technical Problem

A conventional cellulose composite formed of cellulose and a hydrophilic gum was likely to cause aggregation and separation particularly when it was dispersed in an acidic or high salt concentration aqueous medium, and the function as a stabilizer was not sufficiently exerted. For this reason, it was difficult to use it in fruit juice beverages and vegetable beverages, acidic beverages such as a lactobacillus beverage and seasonings such as dressing, mop sauce and sauce.

An object of the present invention is to provide a cellulose composite having low viscosity and excellent dispersion stability and excellent suspension stability in an acidic or high salt concentration water dispersion. Another object of the present invention is to provide a cellulose composite having excellent suspension stability that has never ever been attained in the prior art in acidic or high salt concentration food and drink containing a water-insoluble component such as a functional food material.

Hereinbelow, the "dispersion stability" and "suspension stability" used in the specification of the present application are defined.

The "dispersion stability" refers to the dispersion stability of a cellulose composite itself when the cellulose composite is dispersed in an aqueous medium. More specifically, the "dispersion stability" means that the dispersion gives homogenous appearance without causing e.g., separation, aggregation or sedimentation of cellulose particles.

The "suspension stability" means that when an aqueous medium contains the components other than a cellulose composite, such as cocoa powder, calcium and a functional food material, these components are effectively suspended and stabilized by the addition of the cellulose composite. More specifically, the "suspension stability" means that the dispersion gives homogenous appearance without causing e.g., separation, aggregation or sedimentation of not only cellulose but also of other component particles.

Technical Solution

The present inventors have found that a cellulose composite, which is obtained by highly combining cellulose and a hydrophilic gum and increased in a storage elastic modulus (G'), exhibits low viscosity, excellent dispersion stability and excellent suspension stability in an acidic or high salt concentration water dispersion. Based on this finding, the present invention was achieved.

More specifically, the present inventors, for the first time, have found that, when kneading cellulose and a hydrophilic gum, if a semisolid-state kneading mixture containing a solid content in a predetermined concentration or more and having high viscosity is kneaded by the application of high kneading energy, the kneading energy is easily transferred to the kneading mixture, with the result that formation of a composite of the cellulose and the hydrophilic gum proceeds to enhance the storage elastic modulus (G) of the resultant cellulose composite, and in even the acidic or high salt concentration, said cellulose composite provides a high storage elastic modulus (G').

To describe more specifically, the present invention is as follows:

(1) A cellulose composite comprising cellulose and a hydrophilic gum, wherein the cellulose composite has a storage elastic modulus (G') of 0.06 Pa or more in a water dispersion of pH 4, which contains the cellulose composite in an amount of 1% by mass.
(2) The cellulose composite according to (1), wherein the hydrophilic gum is an anionic polysaccharide.
(3) The cellulose composite according to (1) or (2), wherein the hydrophilic gum is a branched anionic polysaccharide.
(4) The cellulose composite according to any one of (1) to (3), wherein the hydrophilic gum is at least one selected from the group consisting of gellan gum, xanthan gum, karaya gum and psyllium seed gum.
(5) The cellulose composite according to any one of (1) to (4), wherein the hydrophilic gum is psyllium seed gum.
(6) The cellulose composite according to any one of (1) to (5), wherein the cellulose composite comprises 50 to 99% by mass of cellulose and 1 to 50% by mass of the hydrophilic gum and has a storage elastic modulus (G') of 0.15 Pa or more.
(7) The cellulose composite according to any one of (1) to (6), further containing a water soluble gum different from the above-mentioned hydrophilic gum.
(8) The cellulose composite according to any one of (1) to (7), wherein the water soluble gum is at least one selected from the group consisting of carboxymethylcellulose sodium, LM pectin, sodium alginate and gellan gum.
(9) The cellulose composite according to any one of (1) to (8), wherein a mass ratio of the hydrophilic gum and the water soluble gum is from 30/70 to 99/1.
(10) A food and drink containing the cellulose composite according to (1) to (9) wherein the food and drink have pH 5 or less or a salt concentration of 0.01 mol/L or more.
(11) The food and drink according to (10), containing 0.01% by mass or more of a water-insoluble component.
(12) A process for producing a cellulose composite comprising cellulose and a hydrophilic gum, comprising a step of kneading a kneading mixture of the cellulose having a solid content concentration of 20% by mass or more and the hydrophilic gum with a kneading energy of 50 Wh/kg or more, wherein the cellulose composite has a storage elastic modulus (G') of 0.06 Pa or more in a water dispersion of pH 4 which contains the cellulose composite in an amount of 1% by mass.
(13) A cellulose composite obtained by the process according to (12).

Advantageous Effects of Invention

The present invention can provide a cellulose composite having low viscosity, excellent dispersion stability and excellent suspension stability in an acidic or high salt concentration water dispersion. Foods and drinks excellent in dispersion stability can be provided by adding the cellulose composite of the present invention to the foods and drinks such as fruit juice beverages, acidic milk beverages and liquid seasonings. Furthermore, when a water-insoluble component such as a functional food material is added to these foods and drinks, foods and drinks giving homogeneous appearance and having excellent suspension stability can be provided while suppressing e.g., separation, aggregation or sedimentation thereof.

BRIEF DESCRIPTION OF THE DRAWINGS

FIG. 2 is a strain-stress curve obtained by viscoelasticity measurement on a water dispersion containing 1% by mass of cellulose composite K (see Comparative Example 3).

BEST MODE FOR CARRYING OUT THE INVENTION

Figure 1:
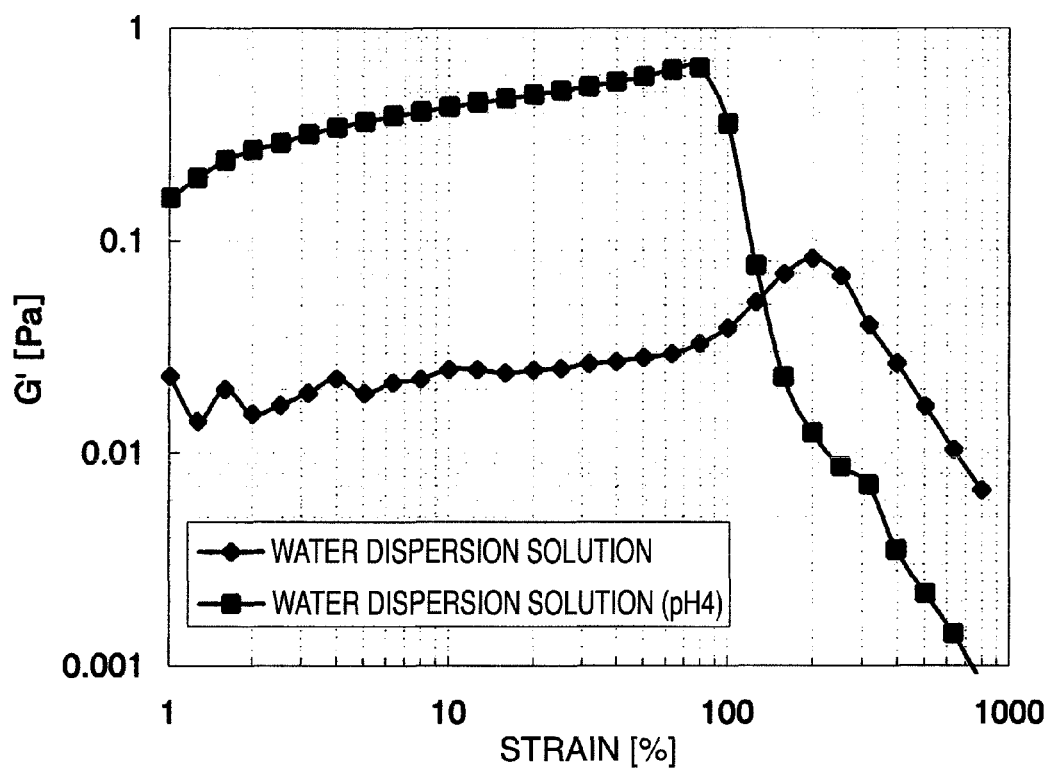
FIG. 1 is a strain-stress curve obtained by viscoelasticity measurement on a water dispersion containing 1% by mass of cellulose composite A (see Example 1).

The present invention will be more specifically described below.

The cellulose composite of the present invention is a cellulose composite comprising cellulose and a hydrophilic gum. The formation of a composite used in the present invention means that the surface of cellulose is coated with a hydrophilic gum with the help of a chemical bond such as a hydrogen bond.

<Cellulose>

In the present invention, the term "cellulose" refers to a naturally derived water-insoluble fibrous substance containing cellulose. Examples of a raw material thereof include wood, bamboo, straw, rice straw, cotton, ramie, bagasse, kenaf, beet, sea squirt and bacteria cellulose. These naturally occurring cellulose materials can be used singly or as a mixture of two types or more, as a raw material.

As the cellulose to be used in the present invention, crystalline cellulose having an average polymerization degree of 500 or less is preferable. The average polymerization degree can be determined based on the reduced specific viscosity method using a copper ethylene diamine solution, which is defined in the crystalline cellulose identification test (3) of "the 14th edition of the Japanese Pharmacopoeia" (issued by Hirokawa Shoten K.K.). The average polymerization degree is preferably 500 or less because, in the step of forming a composite with a hydrophilic gum, a cellulose-based substance becomes subject to physical treatment such as stirring, pulverizing and grinding and formation of a composite is easily accelerated. The average polymerization degree is more preferably 300 or less and further preferably 250 or less. The smaller the average polymerization degree, the easier the control of composite formation. Therefore, the lower limit is not particularly limited; however, a preferable range is 10 or more.

As a method for controlling the average polymerization degree, e.g., a hydrolysis treatment is mentioned. Since depolymerization of amorphous cellulose within a cellulose fiber is accelerated by the hydrolysis treatment, the average polymerization degree decreases. At the same time, since not only the amorphous cellulose mentioned above but also impurities such as hemicellulose and lignin are removed by the hydrolysis treatment, the interior of the fiber becomes porous. By virtue of this, in a step of applying mechanical shearing force to cellulose and a hydrophilic gum, e.g., in a kneading step, the cellulose becomes subject to mechanical treatment, thus it becomes subject to pulverizing. As a result, the surface area of cellulose increases which allows formation of a composite with a hydrophilic gum to be easily controlled.

Examples of the hydrolysis method include, but not particularly limited to, acid hydrolysis, hydrothermal degradation, steam explosion and microwave decomposition. These methods may be used singly or in combination of two types or more. In the acid hydrolysis method, the average polymerization degree can be easily controlled by adding, e.g., protonic acid, carboxylic acid, Lewis acid or heteropolyacid to a cellulose substance dispersed in an aqueous medium, in an appropriate amount, and increasing temperature while stirring. At this time, the reaction conditions such as temperature, pressure and time vary depending upon the type of cellulose, cellulose concentration, type of acid and acid concentration but are appropriately controlled so as to attain a desired average polymerization degree. For example, conditions for treating cellulose by using an aqueous mineral acid solution of 2% by mass or less at 100° C. or more under pressure for 10 minutes or more are mentioned. In the conditions, a catalyst component such as an acid permeates the interior of a cellulose fiber and accelerates hydrolysis, with the result that the use amount of catalyst component decreases and the following purification is easily carried out.

The cellulose contained in the cellulose composite of the present invention preferably has a micro particle shape. The particle shape of the cellulose is represented by a ratio of L/D wherein the major axis (L) and the minor axis (D) of the particle images are obtained by preparing a 1% by mass pure water suspension of the cellulose composite of the present invention, dispersing the suspension by a high-shear homogenizer (trade name "EXCEL AUTOHOMOGENIZER ED-7" manufactured by Nippon Seiki Co., Ltd., treatment conditions: rotation number 15,000 rpm×5 minutes), diluting the resultant water dispersion with pure water to 0.1 to 0.5% by mass, casting the diluted water dispersion onto mica, drying the resultant particles in the air, and measuring the resultant particles thus dried under a high-resolution scanning electron microscope (SEM) or an atomic force microscope (AFM). The particle shape of the cellulose is calculated as an average (ratio) value of L/D of 100 to 150 particles.

The L/D value is preferably less than 20, more preferably 15 or less, further preferably 10 or less, particularly preferably 5 or less, especially preferably less than 5 and most preferably 4 or less.

<Hydrophilic Gum>

The hydrophilic gum refers to a hydrophilic high-molecular substance partially containing a saccharide or a polysaccharide in the chemical structure. The term hydrophilic (property) refers to a property of partly being dissolved in pure water at normal temperature. The hydrophilic property is quantitatively defined that, when the hydrophilic gum (0.05 g) is dissolved in 50 mL of pure water while stirring (using a stirrer chip) until the solution reaches equilibrium, and treated with a membrane filter having a sieve opening of 1 μm, the component passing through the membrane filter is contained in the hydrophilic gum in an amount of 1% by mass or more. As examples of the hydrophilic gum in the case of using a polysaccharide, the followings are preferable:

Examples thereof include psyllium seed gum (CSG), locust bean gum, guar gum, tamarind seed gum, karaya gum, chitosan, gum arabic, gum ghatti, gum traganth, agar, carrageenan, alginic acid, sodium alginate, calcium alginate, HM pectin, LM pectin, *Azotobacter vinelandii* gum, xanthan gum, curdlan, pullulan, dextran, gellan gum, gelatin and a cellulose derivative such as carboxymethylcellulose sodium, carboxymethylcellulose calcium, methylcellulose, hydroxypropylcellulose and hydroxyethylcellulose. These hydrophilic gums may be used in combination of two or more types.

<Anionic Polysaccharide>

Of the hydrophilic gums mentioned above, the hydrophilic gums, which release cations in water and serve as anions per se are called anionic polysaccharide. An anionic polysaccharide is preferably used as a hydrophilic gum. This is because formation of a composite with cellulose is further facilitated and the acid resistance and salt resistance of a cellulose composite increase.

As the anionic polysaccharide, the followings are preferable.

Examples thereof include psyllium seed gum (CSG), karaya gum, carrageenan, alginic acid, sodium alginate, calcium alginate, HM pectin, LM pectin, *Azotobacter vinelandii* gum, xanthan gum, gellan gum and a cellulose derivative such as carboxymethylcellulose sodium and carboxymethylcellulose calcium. These anionic polysaccharides may be used in combination with two or more types.

<Branched Anionic Polysaccharide>

Of the anionic polysaccharides mentioned above, the anionic polysaccharides having a branched chemical structure are called branched anionic polysaccharide. A branched anionic polysaccharide is preferably used as a hydrophilic gum in the cellulose composite of the present invention because the acid resistance of a cellulose composite is further increased. The branched structure herein refers to a structure in which at least one of the three hydroxy groups (primary alcohol at the C6 position) within a hexose included in a polysaccharide is substituted with a substituent having a higher molecular weight than methylol via a chemical bond. The substituent is preferably a saccharide or a polysaccharide structure via an ether bond. As the branched anionic polysaccharide, the followings are preferable.

Examples thereof include psyllium seed gum (CSG), karaya gum, xanthan gum and gellan gum. These anionic polysaccharides may be used in combination of two or more types.

Of these branched anionic polysaccharides, psyllium seed gum (CSG) is particularly preferable since when CSG forms with cellulose, the dispersion stability and suspension stability of a cellulose composite improve.

<Psyllium Seed Gum>

Psyllium seed gum (CSG) refers to a polysaccharide (gum) obtained from outer coat of seed of a plant (*Plantago ovata Forskal*), and more specifically, a polysaccharide obtained from seed coat of *Isagol* or *Plantago* ovate are mentioned.

As long as psyllium seed gum contains a polysaccharide (gum) obtained from outer coat of seed of a plant (*Plantago ovata Forskal*) mentioned above, even if it contains impurities, it falls into the psyllium seed gum (CSG) in the present invention. For example, gum obtained by extracting the polysaccharide with a solvent such as water, husk obtained by crushing the outer coat and a material obtained by using these treatments in combination are all included. Furthermore, they may be in a powder state, a mass state, a cake state or a liquid state.

CSG has a chemical structure of a non-cellulose polysaccharide having a main chain formed of highly branched xylan and a side chain formed of arabinose, xylose, galacturonic acid and rhamnose. The ratios of the saccharides constituting the side chain are: D-xylose (about 60% by mass); L-arabinose (about 20% by mass); L-rhamnose (about 10% by mass); and D-galacturonic acid (about 10% by mass). These mass ratio may change up or down by 5% by mass depending upon the raw material of CSG and the production step for CSG.

Furthermore, as long as CSG has the aforementioned structure, CSG may be hydrolyzed with an acid or a xylanase-like enzyme or the like to control viscosity.

CSG preferably has a viscosity of 200 mPa·s or less as measured in a 1% by mass pure water solution. The viscosity herein refers to a value measured by a viscometer (TVB-10 viscometer, manufactured by Toki Sangyo Co., Ltd.) immediately after a beaker (200 ml), which is filled with an aqueous 1% by mass CSG solution prepared in pure water and controlled to be a temperature of 25° C., is then rotated by a rotor at 60 rpm for 30 seconds. (The rotor can be appropriately changed depending upon the viscosity. The rotor to be used is as follows. 1 to 20 mPa·s: BL type, 21 to 100 mPa·s: No 1, 101 to 300 mPa·s: No 2 and 301 mPa·s: No 3) The viscosity is preferably low because formation of a composite with cellulose is facilitated and also because refreshed feeling in the throat is easily given in the throat when CSG is used in a beverage. The viscosity is more preferably 100 mPa·s or less and further preferably 50 mPa·s or less. The lower limit value is, although not particularly limited, preferably 5 mPa·s or more, as the range obtained as a industrial material.

<Storage Elastic Modulus>

Next, the storage elastic modulus (G') of the cellulose composite of the present invention is described.

The cellulose composite of the present invention has a storage elastic modulus (G') of 0.06 Pa or more, which is obtained as the storage elastic modulus of a water dispersion of pH 4 containing 1% by mass of the cellulose composite. The storage elastic modulus represents rheological elasticity of a water dispersion, and represents degree of composite formation between cellulose and a hydrophilic gum or degree of composite formation between cellulose and a hydrophilic gum and another water soluble gum. A higher storage elastic modulus means that the composite formation between cellulose and a hydrophilic gum or the composite formation between cellulose and a hydrophilic gum and another water soluble gum is accelerated to form a rigid network structure of a cellulose composite in a water dispersion. The more rigid the network structure becomes, the more excellent the dispersion stability and suspension stability a cellulose composite has.

A conventional cellulose had a low storage elastic modulus in an acidic or high salt concentration state and the dispersion stability and suspension stability thereof were extremely low. However, the cellulose composite of the present invention exhibits a high storage elastic modulus even in an acidic or high salt concentration state and has excellent dispersion stability and excellent suspension stability.

In the present invention, the storage elastic modulus was defined as a value obtained by measuring dynamic viscoelasticity of a water dispersion in which a cellulose composite is dispersed in an aqueous medium of pH 4. When strain is given to the water dispersion, the elastic component which keeps stress stored within a cellulose composite network structure, is expressed as a storage elastic modulus.

A method for measuring storage elastic modulus is as follows: first, a cellulose composite is dispersed in pure water by use of a high-shear homogenizer (trade name "Excel autohomogenizer ED-7" manufactured by Nippon Seiki Co., Ltd., treatment conditions: rotation number 15,000 rpm×5 minutes) to prepare a 1.8% by mass pure water dispersion. The water dispersion is mixed with 0.2 M McIlvaine buffer, pH 4 (aqueous solution of 0.2 M disodium hydrogenphosphate and 0.1 M citric acid). After the concentration of the cellulose composite is adjusted to 1% by mass (total amount 300 g, ion concentration 0.06 mol/l, pH 4), the resultant water dispersion is allowed to stand still at room temperature for 3 days. The strain-dependent by stress of the water dispersion is measured by a viscoelasticity measurement apparatus (ARES100FRTN1 type, manufactured by Rheometric Scientific, Inc., geometry: Double Wall Couette type, sweeping is performed at a constant temperature at 25.0° C. and an angular velocity of 20 rad/second within a strain range of 1 to 794%; a water dispersion is slowly supplied by use of a dropper so as not to destroy a microstructure and allowed to stand still for 5 minutes and then measurement is initiated by Dynamic Strain mode). The storage elastic modulus in the present invention refers to a value corresponding to a strain of 20% on the strain-stress curve obtained by the aforementioned measurement. The larger the storage elastic modulus value, the more elastic the structure of the water dispersion formed of the cellulose composite, which represents that cellulose and a hydrophilic gum and another water soluble gum are highly combined.

The storage elastic modulus of a cellulose composite is preferably 0.15 or more, more preferably 0.2 Pa or more and further preferably 0.5 Pa or more.

The upper limit of the storage elastic modulus of a cellulose composite is not particularly determined; however, in view of easy-to-take as a beverage, the upper limit is 6.0 Pa or less. The upper limit of 6.0 Pa or less is preferable because a beverage containing a cellulose composite in the additive amount (which varies depending upon the kinds of beverage, for example, 0.1 to 1.0% by mass in a fruit juice beverage) at which suspension stability is sufficiently obtained, gives light feeling in the throat. Furthermore, even in the case where the additive amount of cellulose composite is lowered to control texture (for example, 0.5% by mass or less), aggregation or the like with a water insoluble component other than cellulose rarely occurs.

<Structure of Cellulose Composite>

The cellulose composite of the present invention is characterized in that the spreading of a hydrophilic gum radially extending from the surface of cellulose is sufficiently large even in acidic conditions. The larger the spreading of a hydrophilic gum extending from the surface of cellulose, the easier to get tangled with adjacent hydrophilic gum of the cellulose composite. As a result, cellulose composites get tangled densely with each other to obtain a rigid network structure. In this manner, storage elastic modulus (G') improves, and dispersion stability and suspension stability increase. The spreading of a hydrophilic gum can be measured by the following method.

First, a cellulose composite is dispersed by a high-shear homogenizer (trade name "Excel autohomogenizer ED-7" manufactured by Nippon Seiki Co., Ltd., treatment conditions: rotation number 15,000 rpm×5 minutes, total amount 300 g) in pure water to prepare a 1.0% by mass pure water dispersion. The water dispersion is mixed with a 0.2 M McIlvaine buffer, pH 3.5 (an aqueous solution of 0.2 M disodium hydrogen phosphate and 0.1 M citric acid) to control the concentration of the cellulose composite to be 0.5% by mass (ion concentration 0.06 mol/l, pH 4.0) and then diluted with pure water to control a concentration of the cellulose composite to be 0.1% by mass. The resultant water dispersion is allowed to stand still at room temperature for 3 days or more. From the water dispersion, an aliquot (5 μl) is slowly suctioned by use of a dropper so as not to destroy a microstructure of the water dispersion and allowed to slowly fall in drops on cleaved mica (1 cm×1 cm). After extra moisture content is blown out by an air duster, the sample deposited on the mica is observed by AFM (scanning probe microscope SPM-9700, manufactured by Shimadzu Corporation, phase mode, OMCL-AC240TS manufactured by Olympus Corporation as a probe is used). In the image under observation, a cellulose particle is seen as a rod-form particle having a height of 2 nm or more and a hydrophilic gum having a height of less than 2 nm radially extended from the cellulose particle around the particle can be observed.

A branched anionic polysaccharide is preferably used as a hydrophilic gum, because a larger spread around the cellulose particle is obtained. Furthermore, psyllium seed gum is preferably used as a hydrophilic gum because a further larger spread around the cellulose particle is obtained.

<Blending Ratio of Cellulose and Hydrophilic Gum>

The cellulose composite of the present invention preferably contains cellulose in an amount of 50 to 99% by mass and a hydrophilic gum in an amount of 1 to 50% by mass.

In forming a composite, the surface of a cellulose particle is coated with a hydrophilic gum via a chemical bond such as a hydrogen bond. By virtue of this, when such a cellulose composite is dispersed in an acidic or high salt concentration aqueous solution, the dispersion stability and suspension stability thereof improve.

Furthermore, formation of a composition is facilitated by using cellulose and a hydrophilic gum satisfying the aforementioned contents and the suspension stability and dispersion stability in the acidic or high salt concentration water dispersion improve to attain an effect of preventing sedimentation of a water-insoluble component such as a functional food material.

<Water Soluble Gum>

It is preferable that the cellulose composite of the present invention further contains a water soluble gum other than a hydrophilic gum. As the water soluble gum, a gum being highly swellable and easily forming a composite with cellulose is preferable.

Examples thereof include locust bean gum, guar gum, tamarind seed gum, karaya gum, chitosan, gum arabic, agar, carrageenan, alginic acid, sodium alginate (hereinafter referred to as "ARG-Na"), HM pectin, LM pectin (hereinafter referred to as "LMP"), *Azotobacter vinelandii* gum, xanthan gum, curdlan, pullulan, dextran, gellan gum (hereinafter referred to as "GLG"), gelatin, cellulose derivatives such as carboxymethylcellulose sodium (hereinafter referred to as "CMC-Na"), carboxymethylcellulose calcium, methylcellulose, hydroxypropylcellulose and hydroxyethylcellulose. They may be used in combination of two types or more.

Of the aforementioned water soluble gums, at least one selected from CMC-Na, LMP, ARG-Na and GLG is preferable. These gums are preferable because they easily combine with cellulose and a hydrophilic gum.

The "CMC-Na" is a compound obtained by substituting a hydroxy group of cellulose with a monochloro acetic acid and having a linear chemical structure of β-1,4 linked D-glucose. CMC-Na is obtained by melting pulp (cellulose) with a sodium hydroxide solution and etherifying it with monochloroacetic acid (or a sodium salt thereof).

Particularly, CMC-Na prepared so as to have a substitution degree and viscosity within a specific range is preferably used in view of composite formation. The substitution degree, which refers to degree of ether linkage of a carboxy methyl group to a hydroxy group in cellulose, is preferably 0.6 to 2.0. The substitution degree preferably falls within the above range because CMC-Na is sufficiently dispersed and production is easy in such range. The substitution degree is more preferably 0.6 to 1.3. The viscosity of CMC-Na in a 1% by mass pure water solution is preferably 500 mPa·s or less, more preferably 200 mPa·s or less, further preferably 50 mPa·s or less, and particularly preferably 20 mPa·s or less. The lower the viscosity of CMC-Na becomes, the easier a composite of cellulose and a hydrophilic gum is formed. The lower limit is not particularly determined; however, it is preferably falls within the range of 1 mPa·s or more.

The "LMP" refers to a compound having a structure in which an acidic polysaccharide (gum) mainly constituted of galacturonic acid and several types of neutral saccharides are present. As long as a compound has such a chemical structure, it falls into LMP in the present invention regardless of the raw material and the production method. Since pectin binds to cellulose, etc., in a plant texture and present as a water-insoluble component, it is obtained by separating from protopectin together with other soluble components under high temperature/acidic conditions. In LMP, the aforementioned galacturonic acid is present in two forms, i.e., methyl ester form and acid form; however, LMP having an esterification degree (the percentage of galacturonic acid present in ester form) of less than 50% is preferable in view of its formation of composite of cellulose and a hydrophilic gum.

The "ARG-Na" refers to a compound having a structure in which α-L-glucuronic acid and β-D-mannuronic acid each having a pyranose form and linked via a 1,4-glycoside linkage. As long as a compound has such a chemical structure, it falls into ARG-Na in the present invention regardless of the raw material and the production method. ARG-Na is one of polysaccharides primarily contained in brown alga as represented by wakame seaweed, tangle weed (kombu) and hijiki.

Industrially, alginic acid is obtained from raw-material alga belonging to the genus *Lessonia, Macrocystis, Ecklonia, Durvillaea* and *Ascophyllum* which are rich in alginic acid. The raw-material algae is pulverized and treated with acid to obtain an extract. The extract is filtrated and the remaining precipitate is treated with acid to obtain alginic acid. The alginic acid is treated with sodium carbonate, etc. and converted into sodium alginate, dried and pulverized to obtain powdery sodium alginate.

An aqueous ARG-Na solution is neutral and fluidal in view of viscosity. The viscosity of ARG-Na, which is measured in a 1% by mass pure water solution, is preferably 300 mPa·s or less, more preferably 100 mPa·s or less and further preferably 30 mPa·s or less. The lower the viscosity, the easier the formation of a composite between cellulose and a hydrophilic gum proceeds, thus more preferable.

The "GLG" refers to a deacetylated microbial polysaccharide obtained by deacetylating a polysaccharide produced by a microbe, Sphingomon elodea and secreted out of the microbial cells. GLG is a linear hetero polysaccharide, which is formed of repeat units consisting of four saccharides: glucose, glucuronic acid, glucose and L-rhamnose, and having a glucuronic acid derived carboxyl group. GLG is divided into two types, a deacyl type and a native type, which differ in the presence or absence of an acetyl group and a glyceryl group in 1-3 linked glucose. The deacyl type is GLG having acetyl group and glyceryl group removed. The native type is GLG having a glucose residue to which a single glyceryl residue and an average ½ acetyl residue are linked. In the present invention, either one of the deacyl type and the native type can be used; however, the deacyl type is preferable since formation of a composite between cellulose and a hydrophilic gum is easily accelerated because of the aforementioned structure.

Of the aforementioned ones, CMC-Na and LMP are more preferably used. In view of composite formation, the most preferable one is CMC-Na.

<Mass Ratio of Hydrophilic Gum and Water Soluble Gum>

The mass ratio of a hydrophilic gum and a water soluble gum as mentioned above is preferably 30/70 to 99/1. In the cellulose composite of the present invention, if the ratio of a hydrophilic gum and a water soluble gum as mentioned above falls within the above range, the cellulose composite of the present invention exhibits dispersion stability and suspension stability in a water dispersion containing the cellulose composite of the present invention within a broad pH range from weak alkaline (pH8) to acidic (pH3). Furthermore, by adding a water soluble gum to the cellulose composite of the present invention, the suspension stability of the cellulose composite of the present invention in the water dispersion, particularly in the acidic region (pH5 or less), is more improved. The content ratio of a hydrophilic gum and a water soluble gum is more preferably 40/60 to 90/10 and further preferably 40/60 to 80/20.

<Volume Average Particle Diameter of Cellulose Composite>

The volume average particle diameter of a cellulose composite is preferably 20 μm or less. The volume average particle diameter herein refers to a cumulative 50% particle size in volume-frequency particle size distribution, which is obtained by preparing a pure water suspension of a cellulose composite in a concentration of 1% by mass, dispersing it by a high-shear homogenizer (trade name "Excel autohomogenizer ED-7" manufactured by Nippon Seiki Co., Ltd., treatment conditions: rotation number 15,000 rpm×5 minutes) and subjecting it to laser diffraction analysis (trade name "LA-910" manufactured by HORIBA Ltd., ultrasonic treatment: 1 minute, refractive index: 1.20).

Furthermore, a cellulose composite is preferably formed of cellulose composite fine particles having a volume average particle diameter of 0.01 to 200 μm. A cellulose composite produced as dry powder constitutes secondary aggregates having these fine particles aggregated therein and having an apparent weight average particle diameter of 10 to 250 μm. The secondary aggregates, when they are put in water and stirred, are disintegrated and dispersed into the aforementioned cellulose composite fine particles. The apparent weight average particle diameter refers to cumulative weight of 50% particle size in a particle size distribution obtained by sieving a sample (10 g) for 10 minutes by use of a low-tap system sieve shaker (Sieve shaker type A manufactured by Taira Kosakusho) and a JIS standard sieve (Z8801-1987). Note that, since the weight average particle diameter of a secondary aggregate of dried cellulose composite and the volume average particle diameter of a cellulose composite in a dispersion solution measured by a laser diffraction analysis differ in measurement principle, the values obtained are not necessarily correlated with each other.

If the volume average particle diameter of a cellulose composite is 20 μm or less, the dispersion stability and suspension stability of a cellulose composite is more easily improved. Furthermore, a food containing the cellulose composite having smooth texture without grainy feeling on tongue can be provided. The volume average particle diameter is more preferably 15 μm or less, particularly preferably 10 μm or less and further preferably 8 μm or less. As the volume average particle diameter decreases, the dispersion stability and suspension stability of a cellulose composite are more easily improved. Therefore, the lower limit is not particularly limited; however, the preferable range is within 0.1 μm or more.

<Amount of Colloidal Component in Cellulose Composite>

Furthermore, a cellulose composite preferably contains a colloidal cellulose component in an amount of 30% by mass or more. The content of the colloidal cellulose component is obtained by preparing 1% by mass pure water suspension of a cellulose composite, dispersing the suspension solution by a high-shear homogenizer (trade name "Excel autohomogenizer ED-7" manufactured by Nippon Seiki Co., Ltd., treatment conditions: rotation number 15,000 rpm×5 minutes), centrifugally separating (trade name "6800 type centrifuge" rotor type RA-400, manufactured by KUBOTA Corporation, treatment conditions: centrifugal force: 2,000 rpm (5600G*, *G represents gravity acceleration)×15 minutes) and determining the mass percentage of a solid content (including cellulose, hydrophilic gum and water soluble gum) remaining in the supernatant after centrifugation. The size of the colloidal cellulose component is 10 μm or less, more preferably 5.0 μm or less, and particularly preferably 1.0 μm or less. The size herein refers to a cumulative 50% particle size in volume-frequency particle size distribution, which is obtained by preparing a pure water suspension of a cellulose composite in a concentration of 1% by mass, dispersing it by a high-shear homogenizer (trade name "Excel autohomogenizer ED-7" manufactured by Nippon Seiki Co., Ltd., treatment conditions: rotation number 15,000 rpm×5 minutes) and subjecting it to laser diffraction analysis (trade name "LA-910" manufactured by HORIBA Ltd., ultrasonic treatment: 1 minute, refractive index: 1.20). If the content of the colloidal cellulose component is 30% by mass or more, the dispersion stability and suspension stability are more easily improved. The content is more preferably 40% by mass or more and particularly preferably 50% by mass or more. The larger the content of the colloidal cellulose component, the higher the dispersion stability. Therefore, the upper limit is not particularly limited; however the preferable range is 100% by mass or less.

<Hydrophilic Substance>

To improve dispersibility to water, a hydrophilic substance other than a hydrophilic gum and a water soluble gum may be further added to the cellulose composite of the present invention. The hydrophilic substance refers to an organic substance highly soluble in cool water and rarely imparting viscosity. Examples of suitable organic substance include hydrophilic polysaccharides such as a starch hydrolysate, a dextrin, an indigestible dextrin, and a polydextrose; oligosaccharides such as fructo-oligosaccharide, galactooligosaccharide, maltooligosaccharide, isomaltooligosaccharide, lactose, maltose, sucrose and α-, β- and γ-cyclodextrin; monosaccharides such as glucose, fructose and sorbose; and sugar alcohols such as maltitol, sorbit and erythritol. These hydrophilic substances may be used in combination with two types or more. Of the aforementioned organic substances, a hydrophilic polysaccharide, such as a starch hydrolysate, a dextrin, an indigestible dextrin and a polydextrose, is preferable in view of dispersibility.

Other components may be freely added to the extent that they do not disturb dispersibility and stability of a composition in water.

<Method for Producing Cellulose Composite>

Next, a method for producing the cellulose composite of the present invention is described.

The cellulose composite of the present invention satisfying a specific storage elastic modulus can be obtained by applying mechanical shearing force to cellulose and a hydrophilic gum in a kneading step, to pulverize cellulose; at the same time, combining the hydrophilic gum to the surface of cellulose. Furthermore, a water soluble gum other than a hydrophilic gum and other additives may be added. The composite treated in the aforementioned process is, if necessary, dried. The cellulose composite of the present invention subjected to the aforementioned mechanical shearing may be in any state such as undried and dried.

To apply mechanical shearing force, a kneading method using a kneading machine, etc. can be used. Examples of the kneading machine include a kneader, an extruder, a planetary mixer and a grinder. They may be used in a continuous system or a batch system. As the kneading temperature, a natural process temperature may be used; however, if heat is generated from a reaction for forming a composite and friction, etc. during a kneading process, kneading may be performed while removing the heat. These machines may be used singly or in combination of two types or more. These machines may be appropriately selected depending upon the requirement of viscosity, etc., in various uses.

Furthermore, the lower the kneading temperature, the more suppressed the deterioration of a hydrophilic gum, with the result that the storage elastic modulus of the obtained cellulose composite (G') increases and thus preferable. The kneading temperature is preferably 0 to 100° C., more preferably 10 to 90° C., particularly preferably 20 to 70° C., further preferably 20 to 60° C. and most preferably 20 to 50° C. To maintain the above-mentioned kneading temperature under high energy, it is free to use a cooling means such as jacket cooling and heat radiation.

The solid content during a kneading process is preferably 20% by mass or more. If the mixture in a semisolid state having high viscosity is kneaded, the kneaded mixture does not become watery and thus kneading energy as described below can be easily transferred to the kneaded mixture to facilitate formation of a composite and thus preferable. The solid content during a kneading process is more preferably 30% by mass or more and further preferably 40% by mass or more. The upper limit is not particularly limited; however, in consideration of avoiding dry state (low-moisture content) of a kneaded mixture and obtaining a sufficient kneading effect and homogeneous kneading state, a practical range of the solid content during a kneading process is preferably 90% by mass or less, more preferably 70% by mass or less and further preferably 60% by mass or less. Furthermore, to adjust the solid content so as to fall within the above range, a necessary amount of water may be added before a kneading step or during the kneading step or these both steps.

Hereinbelow, kneading energy is described. The kneading energy is defined by electric energy per unit mass (Wh/kg) of a kneaded mixture. The kneading energy is preferably 50 Wh/kg or more. If the kneading energy is 50 Wh/kg or more, the grinding property given to the kneaded mixture is high and formation of a composite between cellulose and a hydrophilic gum and another water soluble gum, etc. is accelerated, with the result that, the dispersion stability and suspension stability of an acidic or high salt concentration cellulose composite are improved. The kneading energy is more preferably 80 Wh/kg or more and further preferably 100 Wh/kg or more.

It is considered that the higher the kneading energy becomes, the more the formation of a composite is facilitated. However, if the kneading energy is excessively high, excessively large industrial equipment is required. Since excessively large load is applied to the equipment, the upper limit of kneading energy is preferably set to be 1000 Wh/kg.

The degree of formation of a composite is conceived to be the ratio of hydrogen bonds between cellulose and the other component. As the formation of a composite proceeds, the ratio of hydrogen bonds increases and the effect of the present invention improves. Furthermore, if the formation of a composite proceeds, the storage elastic modulus (G) of a cellulose composite increases.

In obtaining the cellulose composite of the present invention, when the kneaded mixture obtained in the kneading step mentioned above is dried, a known drying method such as a shelf-stage drying, mist drying, belt drying, fluid-bed drying, lyophilization and a microwave drying can be used. When a kneaded mixture is subjected to a drying step, it is preferable that a kneaded mixture is subjected to a drying step without adding water while maintaining the solid content concentration at the kneading step. After drying, the moisture content of a cellulose composite is preferably 1 to 20% by mass. If the moisture content is 20% or less, problems of e.g., stickiness and decay, and a problem in transportation cost rarely occur. The moisture content is more preferably 15% or less and particularly preferably 10% or less. Furthermore, if the moisture content is 1% or more, dispersibility is not deteriorated due to overdrying. The moisture content is more preferably 1.5% or more.

For marketing a cellulose composite, powder form is easily handled. Therefore, the dried cellulose composite is preferably pulverized into powder. However, when spray drying is employed as a drying method, drying and powderization can be simultaneously carried out. In this case, pulverization is not necessary. For pulverizing the dried cellulose composite, known means such as a cutter mill, a hammer mill, a pin mill and a jet mill can be used. Pulverization is performed to the extent that the pulverized cellulose composite can completely pass through a sieve having an opening of 1 mm, more preferably a sieve having an opening of 425 μm and preferably performed so as to obtain an average particle diameter (weight average particle diameter) of 10 to 250 μm.

When the cellulose composite dried is stirred in water, the composite is easily dispersed to form a stable colloidal dispersion having cellulose homogeneously dispersed and having smooth texture without grainy feeling. Particularly, the cellulose composite forms, in an acidic or high salt concentration state, a stable colloidal dispersion without causing aggregation and separation of cellulose and thus exerts an excellent function as a stabilizer, etc.

<Usage>

The cellulose composite of the present invention is suitably used in acidic or high salt concentration foods and drinks, i.e. pH of 5 or less or a salt concentration of 0.01 mol/L or more.

<Additive Amount to Acidic Food and Drink>

The additive amount of a cellulose composite to an acidic food and drink is not particularly limited; however for example, 0.01% by mass or more is preferable in the case of vegetable juice beverages. If the additive amount of cellulose composite is 0.01% by mass or more, dispersion and suspension stability increases and excellent emulsion stability and syneresis prevention effect are obtained. The additive amount is more preferably 0.05% by mass or more and further preferably 0.1% by mass or more. If the additive amount of cellulose composite is 5% by mass or less, aggregation and separation do not occur. Furthermore, the additive amount of 5% by mass or less is preferable in view of easy-to-take as a beverage (feeling in the throat, grainy feeling on the tongue).

<Additive Amount to High Salt Concentration Food and Drink>

The additive amount of cellulose composite to high salt concentration foods and drinks is not particularly limited. However, for example, the additive amount thereof to seasonings such as mop sauce is preferably 0.01% by mass or more. If the additive amount of cellulose composite is 0.01% by mass or more, dispersion and suspension stability increases and excellent emulsion stability and syneresis prevention effect are obtained. The additive amount is more preferably 0.03% by mass or more. If the additive amount of cellulose composite is 5% by mass or less, aggregation and separation do not occur. Furthermore, the additive amount of 5% by mass or less is preferable in view of easy-to-take as a beverage (feeling in the throat, grainy feeling on the tongue).

<Insoluble Component>

Particularly, the cellulose composite is suitably used in acidic or high salt concentration foods and drinks containing a water-insoluble component. The water-insoluble component is a component which does not dissolve in water and, in the present invention, refers to a component capable of passing through a sieve having an opening of 10 mm, more preferably a sieve having an opening of 5 mm and further preferably a sieve having an opening of 2 mm. A water-insoluble component becomes unstable in an acidic or high salt concentration state; however excellent suspension stability is obtained if the cellulose composite of the present invention is added.

Examples of the water-insoluble component include proteins contained in foods and drinks, fruit pieces, lactobacillus contained in lactobacillus beverages, etc., a pulp content in vegetable juice beverages, etc., milk calcium, calcium carbonate, beta-glucan, protein (soybean protein, lactoprotein, collagen), a functional food material having a specific gravity larger than water, such as turmeric and lichi, ubidecarenone compounds such as coenzyme Q10, Omega 3 compounds such as docosahexaenoic acid and eicosapentaenoic acid or esters thereof, and a functional food material having a specific gravity smaller than water, such as a ceramide compound.

The additive amount of functional food materials as mentioned above vary depending upon the intake amount of beverage per day and the efficacy of the material; however the additive amount is preferably 0.01% by mass or more relative to the beverage, more preferably 0.05% by mass or more and further preferably 0.1% by mass or more.

<Acidic Food and Drink>

Specific examples of acidic foods and drinks and high salt concentration foods and drinks is described below.

Specific examples of acidic food and drink of pH 5 or less include vegetable juice beverages containing vegetable juice and/or fruit juice, etc., and vegetable/fruit juice/milk beverages containing vegetable juice and/or fruit juice and milk such as cow milk and/or soy milk, acidic beverages such as an acidic milk beverage, a lactobacillus beverage including drink yogurt, a sport beverage, a health vinegar beverage containing fruit vinegar diluted with water, and acidic foods such as edible ices including ice cream, soft ice cream and sherbet containing fruit juice, which is added as fruit-flavor, and gelatinous foods including jelly and jam. Furthermore, as long as the foods and drinks are served in aforementioned forms at the time of eating and drinking, intermediate product thereof, more specifically, foods and drinks powderized by lyophilization, spray drying, etc., may fall into the acidic foods and drinks in the present invention.

The acidity of pH 5 or less is defined as pH of foods and drinks processed into the various forms as mentioned above in the case of being stored for one or more days in the distribution level or in the case of being served to eating or drinking. A method for measuring pH is as follows. After the solid content is removed from the food and drink as mentioned above by centrifugation and/or filtration, the pH of the resultant food and drink can be measured by a pH meter (pH meter D-50 manufactured by HORIBA).

<Vegetable Juice Beverage>

Vegetable juice beverages contain a component other than a cellulose composite, that is, vegetable juice and/or fruit juice, in an amount of 10% by mass or more and 100% by mass or less. In the present invention, the phrase "containing vegetable juice and/or fruit juice in an amount of 10% by mass or more" means that the ratio of vegetable juice and/or fruit juice to the whole beverage is 10% by mass or more in straight conversion.

The vegetable juice refers to a vegetable extract, vegetable puree, dried vegetable-crush powder or a mixture of these. As vegetable used as a raw material, a vegetable having grassy-smell, which is recognized to be hard to take, is generally used. For example, fruit vegetables include tomato, green pepper and pumpkin; leaf vegetables include cabbage, spinach, lettuce, parsley, watercress, kale and komatsuna; root vegetables include carrot, Japanese radish and burdock; stem vegetables include asparagus and celery; and flower vegetables include broccoli and cauliflower. Examples of green color vegetables include barley young leave, kale, *Angelica keiskei* (asitaba), alfalfa, molokheiya, oats young leave, wheat young leave, broccoli, broccoli sprout, cabbage, komatuna, Japanese radish leave, Japanese radish, potherb mustard, mustard, watercress, cress sprout, wasabi leaf and spinach. Vegetables may be used in combination of two types or more. A method and conditions for producing vegetable juice are not particularly limited. A known method may be employed. An extract may be produced by a method including blanching vegetable, crushing and extracting or by an extraction method performed at low temperature. Furthermore, puree can be produced by blanching vegetable, mushing it by a pulper and a finisher or grinding it by a stone mill or by crashing vegetable into small pieces by a mixer.

The fruit juice is a liquid extracted from a fruit. Examples of the fruit include citrus fruits, apple, grape, peach, pineapple, guava, banana, mango, cassis, blueberry, acerola, prune, papaya, passion fruit, plum, pear, apricot, lychee, melon, pear and Japanese plum. The fruits may be used singly or as a mixture of two types or more.

The citrus fruits refer to fruits of plants belonging to Rutaceae, Rutaceae subfamily. More specifically, the citrus fruits include mandarin oranges such as Wenzhou mandarin orange, Kishu mandarin orange, ponkan orange, Angkor, Mandarin, danzerin, Kouji (Citrus leiocarpa), Shiikuwasha, Tachibana and Shiranui; other oranges such as Natsudaidai, hassaku orange, Hyuganatsu (*Citrus aurantium*), Sanbokan (*Citrus sulcata*), Kawachi bankan, Kinukawa and Naruto; oranges such as Valencia orange, navel orange and blood orange; tangor/tanzero such as *Citrus tankan*, Iyo, Mercot, Kiyomi, Orlando, Minneola and Seminole; limes such as Mexican lime and Tahiti lime; lemonade citrons such as Lisbon lemon, Eureka Lemon, Diamante and Etrog; Shaddock such as Banpeiyu and Tosa shaddock; grapefruits such as Duncan, Marsh, Thompson and ruby-red; yuzu group such as yuzu, kabosu, sudachi, hanayu, kizu; kumquat; and trifoliate orange.

Of the aforementioned citrus fruits, orange juice is the one to which the present invention which is highly effective even in a small amount, is preferably applied. This is because when orange juice is added to a vegetable beverage, it is important to keep flavor balance between acidity and bitterness.

A method and conditions for producing fruit juice are not particularly limited. A known method may be employed. Enrichment factor, enrichment method for fruit juice, etc. are not particularly limited.

Furthermore, also to a protein-added vegetable juice beverage, the present invention is suitably applied. Examples of the proteins include lactoprotein, vegetable protein (soybean protein) and collagen. They may be used as a mixture of two types or more.

The amount of protein added for enrichment, in view of capable of taking a large amount of protein at a time, is preferably 0.1% by mass or more, more preferably 0.5% by mass or more and further preferably 1.0% by mass or more. The upper limit is not particularly limited; however, in view of viscosity of a beverage and easy-to-take as a beverage, the upper limit is preferably 10% by mass or less.

In a method for producing a vegetable juice beverage containing a protein and the cellulose composite of the present invention, at least one surface protecting agent for a protein selected from HM pectin (hereinafter referred to as "HMP"), casein and soybean polysaccharide is preferably used in combination. Of the aforementioned surface coating agents, HMP is preferable since effect of suppressing excessive interaction between cellulose and a protein is superior.

The "HMP" refers to pectin constituted of an acidic polysaccharide (gum) mainly consisting of galacturonic acid and several types of neutral saccharides and having an esterification degree (the ratio of galacturonic acid present in the ester-form) of 50% or more. As long as pectin has this chemical structure, it falls into HMP in the present invention regardless of the raw material and the production method.

The "casein" is one of the lactoproteins contained in cow milk and generally extracted as a milk solid. Casein is a phosphoprotein (phosphorylated protein) in which a phosphoric acid is mostly bound to a serine derived moiety (serine residue) of the amino acids constituting the protein. Casein is not constituted of a single protein and classified into three components: α-casein (alpha casein), β-casein (beta casein) and κ-casein (kappa casein). Casein used in the present invention refers to a composition consisting of at least one of them regardless of the composition of these caseins.

The "soybean polysaccharide" refers to a polysaccharide obtained from an insoluble dietary fiber (bean-curd refuse) generated in producing soybean protein, through extraction and purification in the presence of weak acid. The soybean polysaccharide is chemically constituted of galactose, arabinose, galacturonic acid, rhamnose, xylose, fucose and glucose and has a structure in which galactan and arabinan are bound to a rhamnogalacturonic acid chain.

A method for using HMP and soybean polysaccharide is described. The additive amount of HMP and soybean polysaccharide is preferably 1/20 (mass ratio) or more, more preferably 1/10 or more and further preferably 1/5 or more relative to the total protein amount to be added to a vegetable juice beverage. As an addition method thereof, a method of preparing an aqueous solution or an aqueous suspension of a protein and adding HMP and/or a soybean polysaccharide to the solution (or the suspension) and stirring the mixture is mentioned as an example. In this manner, the surface of the protein is coated with HMP and/or the soybean polysaccharide (in this stage, vegetable juice and fruit juice may be concomitantly present). Thereafter, the cellulose composite of the present invention is added. The cellulose composite is preferably dispersed in water in advance and added because effects such as suspension stabilization and syneresis prevention are enhanced.

Next, a method for using casein is described. The additive amount of casein is preferably 1/40 (mass ratio) or more, more preferably 1/20 or more and further preferably 1/10 or more relative to the total protein amount to be added to a vegetable juice beverage. As an addition method thereof, a method for preparing a water dispersion of the cellulose composite of the present invention, adding casein (casein may be added either in an aqueous solution state or dry powder state) and stirring the mixture is mentioned as an example. In this manner, the surface of the cellulose composite is coated with casein (in this stage, vegetable juice and fruit juice may be concomitantly present). Thereafter, protein is added. The protein is preferably dispersed or dissolved in water in advance and added because effects such as suspension stabilization and syneresis prevention are enhanced.

<Vegetable Fruit Juice Milk Beverage>

The vegetable fruit juice milk beverage refers to a beverage prepared by adding cow milk and/or soy milk to a vegetable juice beverage to enrich protein of the beverage. Cow milk and soy milk may be used singly or in combination and the amount ratio thereof is not limited.

The vegetable fruit juice milk beverage to which the cellulose composite of the present invention is to be added preferably contains, in view of drinking a cow milk and/or soy milk beverage, the cow milk and/or soy milk in an amount of 5% by mass or more and 90% by mass or less.

In the present invention, "containing cow milk and/or soy milk in an amount of 5% by mass or more" means that the ratio of milk relative to the whole beverage is 5% by mass or more in straight conversion even if the cow milk and/or soy milk is added in the form of processed milk such as non-fat milk or low-fat milk.

<Acidic Milk Beverage>

An acidic milk beverage is defined in the ministerial ordinance on Milk and Milk products Concerning Compositional Standards (Ministerial Ordinance on Milk and Milk products) and refers to a beverage containing milk or milk products regardless of the amount thereof. The milk and milk products include liquid milk such as milk and processed milk, cream, powdered skim milk, all powdered milk and fermented milk. Furthermore, the acidic milk beverage in the present invention includes a fermented milk beverage and a non-fermented milk beverage. The acidic milk beverage in the present invention preferably has pH of 3 to 5, more preferably 3.3 to 4.5 and particularly preferably 3.6 to 4.4. The pH within the range is preferable in view of palatability of a beverage. To adjust pH, an organic and inorganic edible acid may be used. Any organic and inorganic edible acid may be used as long as they are generally used in food. Examples thereof that can be used include lactic acid, citric acid, tartaric acid, malic acid, ascorbic acid, acetic acid, fumaric acid, phosphoric acid, adipic acid, gluconic acid, succinic acid, potassium or sodium hydrogen phosphate, potassium or sodium dihydrogen phosphate and fruit juice. Particularly, in view of quality of acidity, lactic acid, citric acid, tartaric acid, malic acid, ascorbic acid and acetic acid are preferable.

<Lactobacillus Beverage>

The lactobacillus beverage refers to a beverage containing viable or non-viable lactobacillus in an amount of 0.01% by mass or more. The base of the beverage may be any of a milk beverage, a fruit juice beverage, a soft drink etc. Examples of a lactobacillus beverage containing viable bacteria include yogurt and a fermented liquid of a vegetable lactobacillus appropriately diluted with the aforementioned beverage base or water. The larger the content of lactobacillus, the larger the effect of the present invention. Thus, the lactobacillus content is more preferably 0.05% by mass and further preferably 0.1% by mass or more.

<Sport Beverage>

The sport beverage refers to a beverage suitable for drinking during or after sporting activity, more specifically refers to a soft drink capable of efficiently replenishing water, an electrolyte, a mineral and energy which are deprived of during sporting activity through perspiration etc. To a sport beverage, e.g., various types of seasonings and nutritional components may be added according to taste. Examples thereof include coloring agents, amino acids, vitamins, mineral salts and spices. Any substances can be added as long as they are usually blended in sport beverages. The sport beverage is characterized in that it contains citric acid or a salt thereof in a predetermined ratio. A method for adding citric acid or a salt thereof to a sport beverage is not particularly limited. Citric acid preparation may be blended to a beverage.

The content of citric acid is preferably 0.15 to 0.5% by mass, further preferably 0.2 to 0.5% by mass and most preferably 0.3 to 0.5% by mass.

<Vinegar Beverage>

The vinegar beverage is suitably taken for health promoting and health maintenance purposes. Vinegar is roughly divided into "brewing vinegar" and "synthetic vinegar" according to the Japan Agricultural Standards. The "brewing vinegar" is distinguished based on the type of raw material and use amount of raw material and include grain vinegar, which is obtained by using a raw material containing grains in a predetermined amount or more, fruit vinegar obtained by using a raw material containing a fruit or fruit juice in a predetermined amount or more and brewing vinegar other than grain vinegar and fruit vinegar. Examples of the grain vinegar include barley vinegar, rice vinegar, malt vinegar, wheat vinegar, sake lees vinegar, unrefined sake vinegar, millet vinegar, pure rice vinegar, unpolished rice vinegar, unpolished rice black vinegar and barley black vinegar. Examples of the fruit vinegar include cider vinegar, grape vinegar, white wine vinegar, red wine vinegar and balsamic vinegar. The type of vinegar is not particularly limited. The vinegar beverage contains acetic acid and the content thereof is preferably 0.05 to 5% by mass, more preferably 0.1 to 3% by mass and further preferably 0.2 to 2% by mass. If the content is 5% by mass or less, acidity and irritating smell are not too strong to drink. Furthermore, if the content is 0.05% by mass or more, acidity is not too weak to be suitably used as a vinegar beverage.

<Viscosity of Acidic Beverage>

The acidic beverage in the present invention preferably has a viscosity at 20° C. measured by a B-type viscometer of 3 to 700 mPa·s. If the viscosity falls within the range, aggregation and precipitation of components are suppressed to prepare an acidic food and drink easy to take. In view of this, the viscosity is more preferably 10 to 400 mPa·s and further preferably 20 to 200 mPa·s.

<Acidic Food>

Examples of the acidic food of pH 5 or less include transparent or opaque liquid-state foods such as a beverage, transparent or opaque solid (semisolid) foods such as jelly.

Specific examples of the liquid-state foods include, in addition of the aforementioned acidic beverages, quasi drug nutrition-supplement drinks, vitamin beverages containing vitamin B group and vitamin C and taste-oriented beverages such as lemon tea and flavored tea. Other than these, fruit syrups seasoned with fruits and fruit juice, and liquid seasonings having acidity (pH5 or less) of mop sauces, soups, dressing and sauces are mentioned.

Furthermore, specific examples of solid (semisolid) foods include gel like foods such as jelly, pudding and jam; acidic milk products such as yogurt and sour cream; edible ices including ice cream, soft ice cream and sherbet containing fruit, fruit pulp, fruit juice for fruit flavoring.

<Edible Ices>

Edible ice refers to a food and drink included in the aforementioned acidic foods and containing ice, when drinking and eating. Examples thereof include ice cream, soft ice cream and sherbet.

<Gel-Like Food>

Gel-like food refers to a food and drink included in the aforementioned acidic foods and containing gel, when drinking and eating. Examples thereof include jelly, pudding and jam. The gelatinization agent herein include an agent containing a protein such as gelatin and egg white, and an agent solidified with a water soluble gum such as, carrageenan, xanthane gum and tamarind seed gum.

<High Salt Concentration Food and Drink>

Specific examples of the high salt concentration (0.01 mol/L or more) foods and drinks include dressings, spreads, mop sauces, soups and creams having food such as sesame seeds and a functional oil emulsion dispersed therein. Furthermore, as long as they take the aforementioned forms at the time of eating and drinking, powderized foods and drinks (e.g., powder seasoning, powder soup, rice with hot green tea or hot soup stock etc.), which are prepared by freeze drying, spray drying, etc. as an intermediate product, also fall into the high salt concentration foods and drinks.

The high salt concentration of 0.01 mol/L or more refers to a salt concentration of food and drink variously processed into the aforementioned forms in the case of being stored for one or more days in the distribution level or in the case of being served to eating or drinking. The salt concentration refers to the concentration of a salt content in an aqueous solution obtained by removing a solid content in a food and drink as mentioned above by centrifugation and/or filtration, and refers to molar concentration (mol/L) in terms of NaCl, which is converted from the value (% by mass) measured by a salt meter (digital salt meter ES-421, manufactured by ATAGO).

<Method for Adding Cellulose Composite>

As a method for adding the cellulose composite of the present invention to an acidic or high salt concentration food and drink, the following method is mentioned. The cellulose composite of the present invention can be added by dispersing it in water simultaneously with a main raw-material or components such as a coloring agent, a spice, an acidulant and a thickener.

Furthermore, when a cellulose composite dry powder is dispersed in an acidic or high salt concentration aqueous medium, it is preferable that the cellulose composite is once dispersed in water and then added to a desired food form. This is because the dispersion stability of the cellulose composite is improved. When the cellulose composite is dry powder, the cellulose composite can be dispersed in water by a method of using a kneading machine including various types of dispersion machines, emulsifiers and grinders usually used in production step of foods. Specific examples of the kneading machine that can be used include various types of mixers such as a propeller stirrer, a high-speed mixer, a homo mixer and a cutter; mills such as a ball mill, a colloidal mill, a beads mill and a grinder; dispersers/emulsifiers represented by high-pressure homogenizer such as high pressure homogenizer and a nanomizer; and kneading machines represented by e.g., a planetary mixer, kneader, extruder and turbulizer. The kneading machines may be used in combination of two types or more. Furthermore, dispersion can be easily made if kneading is performed while increasing the temperature.

For example, when a cellulose composite is added to a vegetable juice beverage or a vegetable fruit juice milk beverage, a method of mixing the cellulose composite to a vegetable juice beverage or a vegetable fruit juice milk beverage and then dispersing the cellulose composite by a homo mixer or a method of dispersing the cellulose composite by a homo mixer in water and then mixing the resultant dispersion with a vegetable juice beverage or a vegetable fruit juice milk beverage are mentioned. By adding a cellulose composite to a vegetable juice beverage and a vegetable fruit juice milk beverage, sedimentation of an insoluble component of the pulp content contained in a beverage can be suppressed.

When a cellulose composite is added to a lactobacillus beverage, a method of adding a cellulose composite to a lactobacillus beverage and then dispersing the cellulose composite by a homo mixer, or a method of dispersing a cellulose composite by a homo mixer in water and then mixing with a lactobacillus beverage are mentioned. By adding a cellulose composite to a lactobacillus beverage, cellulose can be stably dispersed without aggregating cellulose; and at the same time, sedimentation of lactobacillus and protein in a lactobacillus beverage can be suppressed.

When an acidic or high salt concentration food and drink contains particles of 20 μm or more as a water-insoluble component in an amount of 0.01% by mass or more, it is preferable that a pressure of 10 MPa or more is applied by a high-pressure homogenizer (for example, Manton-Gaulin homogenizer manufactured by APV) in its production step to homogenize the particles, in view of long-term storage stability.

The cellulose composite of the present invention is significantly improved in colloid dispersibility in an aqueous medium of an acidic or high salt concentration state and can be applied to, other than foods, medical supplies, cosmetics, raw materials for cleaners and treatment agents for food and industrial use, raw materials for detergents for household use (clothes, a kitchen, a house, tableware, etc.), paints, pigments, ceramics, water based latex, agents for emulsification (polymerization), agents for agriculture, agents for fiber processing (refinement agent, dyeing assistant, softener, water repellent), soil-release finishing agents, concrete admixtures, printing inks, lubrication oils, antistatic agents, antifog additives, lubricants, dispersants, drinking agents, etc. Of these, in food, particularly, acidic foods and salt containing foods, or combination thereof, a stable dispersion state can be maintained without causing aggregation, separation, syneresis and sedimentation. Furthermore, the cellulose composite is significantly improved in performance as a stabilizer and a problem of grainy feeling can be overcome by its smooth feeling on the tongue and body. Therefore, the cellulose composite can be used in a wide variety of foods other than those described above.

EXAMPLES

The present invention is described by way of the following Examples. However, these should not be construed as limiting the scope of the present invention.
<Method for Measuring Storage Elastic Modulus of Cellulose Composite>
(1) A cellulose composite was dispersed in pure water by a high-shear homogenizer (trade name "Excel autohomogenizer ED-7" manufactured by Nippon Seiki Co., Ltd., treatment conditions: rotation number 15,000 rpm×5 minutes) to prepare a pure water dispersion of 1.8% by mass in concentration.
(2) The water dispersion and 0.2 M McIlvaine buffer, pH 4 (aqueous solution of 0.2 M disodium hydrogenphosphate and 0.1 M citric acid) were mixed to adjust the concentration of the cellulose composite to be 1% by mass (total amount 300 g, ion concentration: 0.06 mol/L, pH 4). Thereafter, the resultant water dispersion was allowed to stand still at room temperature for 3 days.
(3) The strain dependent by stress of the water dispersion was measured by a viscoelasticity measurement apparatus (ARES100FRTN1 type, manufactured by Rheometric Scientific, Inc., geometry: Double Wall Couette type, sweeping was performed at strain of the range of 1 to 794%). In the present invention, as storage elastic modulus (G'), a value corresponding to a strain of 20% on the strain-stress curve obtained by the aforementioned measurement was used.
<Volume Average Particle Diameter of Cellulose Composite>
(1) A cellulose composite was suspended in pure water in a concentration of 1% by mass and dispersed by a high-shear homogenizer (trade name "Excel autohomogenizer ED-7" manufactured by Nippon Seiki Co., Ltd., treatment conditions: rotation number 15,000 rpm×5 minutes).
(2) The resultant water dispersion was subjected to laser diffraction analysis (trade name "LA-910", manufactured by HORIBA Ltd., ultrasonic treatment: 1 minute, refractive index: 1.20) to measure particle size distribution. In the volume-frequency particle size distribution obtained herein, cumulative 50% particle size was defined as the volume average particle diameter.
<Content of Colloidal Cellulose Component in Cellulose Composite>
(1) A cellulose composite was suspended in pure water in a concentration of 1% by mass and dispersed by a high-shear homogenizer (trade name "Excel autohomogenizer ED-7", manufactured by Nippon Seiki Co., Ltd., treatment conditions: rotation number 15,000 rpm×5 minutes).
(2) Subsequently, centrifugation was performed (trade name "6800 type centrifuge" rotor type RA-400 type, manufactured by KUBOTA Corporation, treatment conditions: centrifugal force: 2,000 rpm (5600G*, *G represents gravity acceleration)×15 minutes; a centrifuge tube was charged with a total amount of 50 g).
(3) After the centrifugation, the supernatant was fed into a glass weighing bottle and dried at 60° C. for 15 hours and thereafter at 105° C. for 2 hours. After a constant weight was obtained in a desiccator, the weight was measured. Separately, non-centrifuged water dispersion was dried in the same manner and the weight was measured. From the results, the mass percentage of the cellulose solid content remaining in the supernatant was obtained in accordance with the following expression.

Calculating formula:

(solid content of the supernatant(50 g))/(solid content of non-centrifuged water dispersion(50 g))×100

<Dispersion Stability: Observation of Appearance of Dispersed Cellulose Composite Water Dispersion>
The water dispersion obtained by the above-mentioned storage elastic modulus measuring method (2) was visually evaluated based on the criteria defined with respect to the following four items.
(Separation) evaluated based on the volume of an upper light-color layer of a glass cylinder.
⊚ (excellent): no separation, ○ (good): separation less than 10%, Δ (acceptable): separation less than 30%, x (unacceptable): separation 30% or more
(Sedimentation) evaluated based on the amount of deposited substance on the bottom of a glass cylinder.
⊚ (excellent): no sedimentation, ○ (good): partially thin sedimentation, Δ (acceptable): entirely thin sedimentation, x (unacceptable): entirely thick sedimentation
(Aggregation) evaluated based on the amount of non-homogeneous portion in the entire glass cylinder.
⊚ (excellent): homogeneous, ○ (good): slightly partially non-homogeneous, Δ (acceptable): partially non-homogeneous, x (unacceptable): entirely non-homogeneous
<Viscosity of Cellulose Composite Water Dispersion>
The water dispersion obtained by the above-mentioned storage elastic modulus measuring method (2) was measured, 3 hours after dispersion (stored at 25° C.), by a B-type viscometer (rotor revolving speed: 60 rpm. A sample was set and allowed to stand still for 30 seconds and then rotated for 30 seconds and measured. Note that, the rotor can be appropriately changed depending upon the viscosity. The rotor used herein is as follows. More specifically, 1 to 20 mPa·s: BL type, 21 to 100 mPa·s: No 1, 101 to 300 mPa·s: No 2, 301 mPa·s: No 3). The measurement results are classified based on the following criteria.

(Viscosity) ◉ (excellent): 1 to 50, ○ (good): 51 to 75, Δ (acceptable): 76 to 100, x (unacceptable): 101 or more [mPa·s]

<Shape of Cellulose Particle 1: Cellulose Composites A to M Fall into this Category>

A cellulose composite was suspended in pure water in a concentration of 1% by mass and dispersed by a high-shear homogenizer (trade name "Excel autohomogenizer ED-7" manufactured by Nippon Seiki Co., Ltd., treatment conditions: rotation number 15,000 rpm×5 minutes). The resultant water dispersion was diluted with pure water up to 0.1% by mass and a single drop was casted on mica by use of a dropper. Excessive moisture content was blown out by an air duster and dried in the air to prepare a sample. An image was obtained by an atomic force microscope (apparatus of Nano Scope IV MM, manufactured by Digital Instruments, scanner EV, measuring mode Tapping, probe NCH type silicon single crystal probe). Based on the image, particles having a major axis (L) of 2 μm or less were selected and the major axis (L) and the minor axis (D) thereof were measured. The shapes of cellulose particles, which are defined by the ratio of (L/D), were calculated as an average value of L/D of 100 to 150 particles.

<Shape of Cellulose Particle 2: Cellulose Composites N and O Fall into this Category>

A cellulose composite was suspended in pure water in a concentration of 0.25% by mass and dispersed by a high-shear homogenizer. (trade name "Excel autohomogenizer ED-7" manufactured by Nippon Seiki Co., Ltd., treatment conditions: rotation number 15,000 rpm×5 minutes). The resultant water dispersion was diluted with pure water up to 0.01 to 0.05% by mass and a single drop was casted on mica by use of a dropper. Excessive moisture content was blown out by an air duster and dried in the air to prepare a sample. Platinum palladium was vapor-deposited with a thickness of 3 nm. An image was obtained by a scanning electron microscope (apparatus of JSM-5510LV type, manufactured by JEOL Ltd.). Based on the image, the major axis (L) and the minor axis (D) of the image were measured. The shapes of cellulose particles, which are defined by the ratio of (L/D), were calculated as an average value of L/D of 100 to 150 particles.

<Suspension Stability: Observation of Appearance of Food and Drink>

Various types of beverages (as to the production method, see the following Examples and Comparative Examples) were visually evaluated for the following 4 items based on the criteria previously determined.

(Separation) evaluated based on the volume of an upper light-color layer of a glass cylinder.

◉ (excellent): no separation, ○ (good): separation less than 10%, Δ (acceptable): separation less than 30%, x (unacceptable): separation 30% or more (Sedimentation) evaluated based on the amount of deposited substance on the bottom of a glass cylinder.

◉ (excellent): no sedimentation, ○ (good): partially thin sedimentation, Δ (acceptable): entirely thin sedimentation, x (unacceptable): entirely thick sedimentation (Aggregation) evaluated based on the amount of non-homogeneous portion in the entire glass cylinder.

◉ (excellent): homogeneous, ○ (good): slightly partially non-homogeneous, Δ (acceptable): partially non-homogeneous, x (unacceptable): entirely non-homogeneous <Viscosity of Beverage * the Evaluation Criteria do not Apply to Food Other than Beverage>

One hour (stored at 25° C.) after production of each beverage (as to the production method, see the following Examples and Comparative Examples), viscosity was measured by a B-type viscometer (rotor revolving speed: 60 rpm. A sample was set, allowed to stand still for 30 seconds, rotated for 30 seconds and then measured. Note that, the rotor can be appropriately changed depending upon the viscosity. The rotors used herein are as follows. 1 to 20 mPa·s: BL type, 21 to 100 mPa·s: No 1, 101 to 300 mPa·s: No 2, 301 mPa·s: No3). The measurement results were classified based on the following criteria.

(Viscosity) ◉ (excellent): 1 to 10, ○ (good): 10 to 20, Δ (acceptable): 20 to 50, x (unacceptable): 50 or more [mPa·s]. Hereinafter, cellulose will be simply referred to as MCC, psyllium seed gum as CSG, carboxymethylcellulose sodium as CMC-Na, gellan gum as GLG, sodium alginate as ARG-Na and LM pectin as LMP.

Example 1

Commercially available DP pulp was cut into pieces and hydrolyzed in 2.5 mol/L hydrochloric acid at 105° C. for 15 minutes, washed with water and then filtrated to prepare a wet-cake like cellulose having a solid content of 50% by mass (average polymerization degree was 220).

Subsequently, MCC wet cake, CSG (PG020, manufactured by MRC Polysaccharide Co., Ltd., viscosity of 1% by mass solution thereof: 40 mPa·s,), CMC-Na (F-7A manufactured by Dai-ichi Kogyo Seiyaku Co., Ltd., viscosity of 1% solution: 11 mPa·s) were prepared and were fed to a planetary mixer (5DM-03-R manufactured by SHINAGAWA MACHINERY WORKS Co., Ltd., agitating blade: hook type) such that the mass ratio of MCC/CSG/CMC-Na is 90/5/5, and water was added so as to satisfy a solid content of 45% by mass.

Thereafter, the mixture was kneaded at 126 rpm to obtain cellulose composite A. The kneading energy was controlled according to kneading time in the planetary mixer and actual measurement value thereof was 0.6 kWh/kg. As the kneading temperature, the temperature of the kneaded mixture was directly measured by a thermocouple. The kneading temperature was 20 to 60° C. throughout the kneading and the achieving temperature was 50 to 60° C.

The storage elastic modulus (G') of the resultant cellulose composite A was 0.48 Pa. Furthermore, the volume average particle diameter of cellulose composite A was 6.2 pun, the colloidal cellulose component was 55% by mass, and the particle L/D was 1.6. The dispersion stability (separation, sedimentation, aggregation, viscosity) of cellulose composite A was evaluated and the results are shown in Table-1.

Using this, calcium enriched vegetable fruit juice was prepared as follows.

Cellulose composite A was dispersed in water by a TK homo mixer (MARKII manufactured by Tokushu Kika Kogyo Co., Ltd.) at 8,000 rpm for 10 minutes to obtain a pure water dispersion containing 6% by mass of cellulose composite A. A commercially available vegetable fruit juice (vegetable life 100 manufactured by KAGOME Co., Ltd.) dispersed by a TK homo mixer and the cellulose composite A pure water dispersion were added such that the solid content concentration of cellulose composite A was set to 0.3% by mass and dispersed by a TK homo mixer to prepare a beverage.

To the beverage, milk calcium (additive amount in the beverage is 0.2% by mass) was added and stirred by use of a TK homo mixer at 4,000 rpm for 5 minutes to obtain a calcium enriched vegetable fruit juice. This was allowed to stand still for 1 hour in a 25° C. atmosphere and thereafter the viscosity of the beverage was measured. Furthermore, this was stored in a 100 ml-volume glass cylinder, allowed to stand still at room temperature for 3 days and the appearance (separation, sedimentation, aggregation, viscosity) was visually observed. The evaluation results of suspension stability are shown in Table-1.

Example 2

A wet-cake like cellulose was prepared in the same manner as in Example 1 and a cellulose water dispersion was prepared in the conditions that MCC/CSG/CMC-Na were contained in a mass ratio of 90/3/7 and a solid content was 40% by mass. The cellulose water dispersion was kneaded by the same apparatus as in Example 1 to obtain cellulose composite B. The kneading energy was 0.1 kWh/kg. The kneading temperature, which was measured in the same manner as in Example 1, was 20 to 60° C. throughout the kneading and the achieving temperature was 50 to 60° C.

The storage elastic modulus (G') was 0.2 Pa and the volume average particle diameter was 6.8 μm. The colloidal cellulose component was 45% by mass and the particle L/D was 2.0. The dispersion stability was evaluated by using cellulose composite B in the same manner as in Example 1.

Furthermore, this was used in the same manner as in Example 1 to prepare a calcium enriched vegetable fruit juice and suspension stability was evaluated. The results are shown in Table-1.

Example 3

A wet-cake like cellulose was prepared in the same manner as in Example 1 and weighed such that MCC/CSG/GLG (Kelco gel manufactured by CP KELCO, Lot070628, the viscosity of 1% by mass solution: 1222 mPa·s) were contained in a mass ratio of 90/9/1. After water was added such that a solid content was 49.5% by mass, the mixture was kneaded by a planetary mixer to obtain cellulose composite C. The kneading energy was 0.5 kWh/kg. The kneading temperature, which was measured in the same manner as in Example 1, was 20 to 60° C. throughout the kneading and the achieving temperature was 50 to 60° C.

The resultant cellulose composite C had a storage elastic modulus (G') of 0.18 Pa and a volume average particle diameter of 7.5 μm. The content of a colloidal cellulose component was 53% by mass and the particle L/D was 1.6. The dispersion stability was evaluated by using cellulose composite C in the same manner as in Example 1.

Furthermore, this was used to prepare a calcium enriched vegetable fruit juice and suspension stability was evaluated in the same manner as in Example 1. The results are shown in Table-1.

Example 4

A wet-cake like cellulose was prepared in the same manner as in Example 1 and weighed such that MCC/CSG/CMC-Na were contained in a mass ratio of 50/25/25. After water was added such that a solid content was 49% by mass, the mixture was kneaded by a planetary mixer to obtain cellulose composite D. The kneading energy was 0.6 kWh/kg. The kneading temperature, which was measured in the same manner as in Example 1, was 20 to 60° C. throughout the kneading and the achieving temperature was 50 to 60° C.

The storage elastic modulus (G') was 0.2 Pa and the volume average particle diameter was 5.8 μm. The colloidal cellulose component was 36% by mass and the particle L/D was 1.6. The dispersion stability was evaluated by using cellulose composite D in the same manner as in Example 1.

Furthermore, this was used in the same manner as in Example 1 to prepare a calcium enriched vegetable fruit juice and suspension stability was evaluated. The results are shown in Table-1.

Example 5

A wet-cake like cellulose was prepared in the same manner as in Example 1 and weighed such that MCC/CSG/ARG-Na (KIMICA arginine SKAT-UVL manufactured by KIMICA Corporation, 1% solution had a viscosity of 4.1 mPa·s) were contained in a mass ratio of 95/2.5/2.5. After water was added such that a solid content was 45% by mass, the mixture was kneaded by a planetary mixer to obtain cellulose composite E. The kneading energy was 0.6 kWh/kg. The kneading temperature, which was measured in the same manner as in Example 1, was 20 to 60° C. throughout the kneading and the achieving temperature was 50 to 60° C.

The storage elastic modulus (G') was 0.5 Pa and the volume average particle diameter was 7.8 μm. The colloidal cellulose component was 43% by mass and the particle L/D was 1.6. The dispersion stability was evaluated by using cellulose composite E in the same manner as in Example 1.

Furthermore, this was used in the same manner as in Example 1 to prepare a calcium enriched vegetable fruit juice and suspension stability was evaluated. The results are shown in Table-1.

Example 6

A wet-cake like cellulose was prepared in the same manner as in Example 1 and weighed such that MCC/CSG were contained in a mass ratio of 90/10. After water was added such that a solid content was 45% by mass, the mixture was kneaded by a planetary mixer to obtain cellulose composite F. The kneading energy was 0.5 kWh/kg. The kneading temperature, which was measured in the same manner as in Example 1, was 20 to 60° C. throughout the kneading and the achieving temperature was 50 to 60° C.

The storage elastic modulus (G') was 0.15 Pa and the volume average particle diameter was 7.4 μm. The colloidal cellulose component was 56% by mass and the particle L/D was 1.6. The dispersion stability was evaluated by using cellulose composite F in the same manner as in Example 1.

Furthermore, this was used in the same manner as in Example 1 to prepare a calcium enriched vegetable fruit juice and suspension stability was evaluated. The results are shown in Table-2.

Example 7

A wet-cake like cellulose was prepared in the same manner as in Example 1 and weighed such that MCC/CSG/LMP (LNSN325, manufactured by Unitec Foods Co., Ltd.) were contained in a mass ratio of 90/5/5. After water was added such that a solid content was 45% by mass, the mixture was kneaded by a planetary mixer to obtain cellulose composite M. The kneading energy was 0.5 kWh/kg. The kneading temperature, which was measured in the same manner as in Example 1, was 20 to 60° C. throughout the kneading and the achieving temperature was 50 to 60° C.

The storage elastic modulus (G') was 0.17 Pa and the volume average particle diameter was 7.2 μm. The colloidal cellulose component was 54% by mass and the particle L/D was 1.6. The dispersion stability was evaluated by using cellulose composite M in the same manner as in Example 1.

Furthermore, this was used in the same manner as in Example 1 to prepare a calcium enriched vegetable fruit juice and suspension stability was evaluated. The results are shown in Table-1.

Comparative Example 1

A wet-cake like cellulose was prepared in the same manner as in Example 1 and weighed such that MCC/CSG/CMC-Na were contained in a mass ratio of 80/0/20. After water was added such that a solid content was 45% by mass, the mixture was kneaded by a planetary mixer to obtain cellulose composite G. The kneading energy was 0.5 kWh/kg. The kneading temperature, which was measured in the same manner as in Example 1, was 20 to 60° C. throughout the kneading and the achieving temperature was 50 to 60° C.

Cellulose composite G had a storage elastic modulus (G') of 0.02 Pa and a volume average particle diameter of 8.8 μm. The colloidal cellulose component of 35% by mass and a particle L/D of 1.6. The dispersion stability was evaluated by using cellulose composite G in the same manner as in Example 1.

Furthermore, this was used in the same manner as in Example 1 to prepare a calcium enriched vegetable fruit juice and suspension stability was evaluated. The results are shown in Table-2.

Comparative Example 2

A wet-cake like cellulose was prepared in the same manner as in Comparative Example 1 and weighed such that MCC/CSG/CMC-Na were contained in a mass ratio of 90/5/5. After water was added such that a solid content was 28% by mass, the mixture was kneaded by a planetary mixer to obtain cellulose composite J. The kneading energy was 0.04 kWh/kg. The kneading temperature, which was measured in the same manner as in Example 1, was 20 to 60° C. throughout the kneading and the achieving temperature was 50 to 60° C.

The storage elastic modulus (G') of cellulose composite J was 0.01 Pa and the volume average particle diameter was 13.5 μm. The colloidal cellulose component was 28% by mass and the particle L/D was 2.4. The dispersion stability was evaluated by using cellulose composite J in the same manner as in Comparative Example 1.

Furthermore, this was used in the same manner as in Comparative Example 1 to prepare a calcium enriched vegetable fruit juice and suspension stability was evaluated. The results are shown in Table-2.

Comparative Example 3

Commercially available DP pulp was cut into pieces and hydrolyzed in 10% by mass hydrochloric acid at 105° C. for 20 minutes. The acid insoluble residue obtained by the hydrolysis was filtrated and washed to prepare a cellulose water dispersion having a solid content of 10% by mass (average polymerization degree was 200). The average particle diameter of the hydrolysis cellulose was 17 pin. The cellulose water dispersion was subjected twice to a pulverizing process performed by a medium stirring wet-process pulverization apparatus (apex mill, AM-1 type, manufactured by Kotobuki Engineering & Manufacturing Co., Ltd.) using zirconia beads having a diameter of 1 mm φ as a medium in the conditions where a stirring blade rotation number was 1800 rpm and a cellulose water dispersion supply amount was 0.4 L/min to obtain micro cellulose paste.

A paste-like micro cellulose/CSG/CMC-Na (substitution degree: 0.90, viscosity: 7 mPa·s) were weighed so as to satisfy a mass ratio of 80/0/20. To this mixture, pure water was added so as to satisfy a total solid content concentration of 11% by mass. The resultant mixture was dispersed by a TK homo mixer (MARKII, manufactured by Tokushu Kika Kogyo Co., Ltd.) at 8,000 rpm for 20 minutes to prepare a paste-like water dispersion (as the kneading energy was calculated from power consumption of the apex mill and TK homogenizer and a treatment amount, it was 0.03 kWh/kg. The kneading temperature, which was measured in the same manner as in Example 1, was 20 to 60° C. throughout the kneading and the achieving temperature was 50 to 60° C.).

The water dispersion was dried by a drum dryer (KDD-1 type, manufactured by Kusunoki Kikai Seisakusho) at a water vapor pressure of 2 Kg/cm², a rotation number of 0.6 rpm, scratched out by a scraper and roughly pulverized by a flush mill (manufactured by Fuji Paudal Co., Ltd.) to obtain thin slice or scale like cellulose composite K. The kneading energy was 0.03 kWh/kg and the storage elastic modulus (G') of cellulose composite K was 0.01 Pa and a volume average particle diameter thereof was 3.4 μm. The colloidal cellulose component was 40% by mass and particle L/D was 2.4. Dispersion stability was evaluated by using cellulose composite K in the same manner as in Comparative Example 1.

Furthermore, this was used to prepare a calcium enriched vegetable fruit juice and suspension stability was evaluated in the same manner as in Comparative Example 1. The results are shown in Table-2.

Comparative Example 4

Commercially available DP pulp was cut into pieces and hydrolyzed in 10% by mass hydrochloric acid at 105° C. for 20 minutes. The acid insoluble residue obtained by the hydrolysis was filtrated and washed to obtain a wet-cake like cellulose having a moisture content of 60% by mass. Water was added so as to satisfy a solid content of 45% by mass and the resultant cellulose was treated by a planetary mixer for 2 hours in the same conditions as in Example 1. To the ground material, water was added so as to have a solid content of 7% by mass and dispersed by a high-shear homogenizer (trade name "Excel autohomogenizer ED-7" manufactured by Nippon Seiki Co., Ltd., treatment conditions: rotation number 15,000 rpm×5 minutes). Thereafter, centrifugation was performed at a centrifugal force of 2500G for 10 minutes to obtain an MCC water dispersion having a solid content of 4% by mass as an upper layer.

Subsequently, to the MCC water dispersion, CSG and CMC-Na were fed so as to satisfy the composition of Example 1 and homogeneously stirred by a propeller stirrer to prepare a water dispersion (the solid content of the water dispersion was 4 to 5% by mass). After the drum surface was treated by a silicone mold releasing agent, the water dispersion was dried by a drum dryer (KDD-1 type, manufactured by Kusunoki Kikai Seisakusho) at a water vapor pressure of 0.12 MPa and a rotation number of 1.0 rpm to obtain film-like cellulose composite L.

The total kneading energy was 0.08 kWh/kg (the energy of the planetary mixer was 0.08 kWh/kg and the energy of others was even in total less than 0.005 kWh/kg). The kneading temperature (propeller stirring) in the coexistence with a hydrophilic gum, which was measured in the same manner as in Example 1, was 20 to 60° C. throughout the kneading and achieving temperature was 50 to 60° C.

A volume average particle diameter was 3.5 µm, a colloidal cellulose component was 72% by mass and particle L/D was 1.6 (the ratio of particles of 10 µm or more in a particle size distribution obtained by measurement for a volume average particle diameter was 2.5%). A storage elastic modulus was measured in the same manner as in Example 1. As a result, it was 0.01 Pa.

In Comparative Example 4, the kneading energy applied to cellulose falls within a preferable range in the present invention; however, CSG, CMC-Na were not present in the treatment by a planetary mixer, where kneading energy is mostly applied. Therefore, it is considered that MCC, CSG and CMC-Na were not formed into a composite and the storage elastic modulus was outside the range of the present invention.

A calcium enriched vegetable fruit juice was prepared by using this in the same manner as in Comparative Example 1 and the suspension stability of the juice was evaluated. The results are shown in Table-2.

Example 8

Cellulose composite A was obtained in the same manner as in Example 1. This was used to prepare a calcium enriched sports drink as follows.

A commercially available sports drink (Aquarius manufactured by Coca-Cola Company Limited, prepared from a powder), a pure water dispersion containing 6% by mass of cellulose composite A and milk calcium were weighed. They were stirred by a TK homo mixer (MARKII manufactured by Tokushu Kika Kogyo Co., Ltd.) at 8,000 rpm for 5 minutes to obtain a calcium enriched sports drink. The solid content of cellulose composite A in the drink was 0.3% by mass and the additive amount of milk calcium was 0.2% by mass.

After this was allowed to stand still for 1 hour in the 25° C. atmosphere, the viscosity of the drink was measured. Furthermore, this was stored in a 100 ml-volume glass cylinder and allowed to stand still at room temperature for 3 days. The appearance (separation, sedimentation, aggregation, viscosity) was visually observed to evaluate suspension stability in the same manner as in the calcium enriched vegetable juice. The results are shown in Table-1.

Example 9

Cellulose composite A was obtained in the same manner as in Example 1. Using this Cellulose composite A, a beta glucan enriched vegetable fruit juice was prepared.

The beta glucan enriched vegetable fruit juice was prepared in the same manner as in Example 1, except that milk calcium was replaced with barley beta glucan (E-70S, manufactured by ADEKA Corp.) and the additive amount of water-insoluble component in the beverage was set to be 0.5% by mass and the suspension stability of the juice was evaluated. The results are shown in Table-1.

Example 10

Cellulose composite A was obtained in the same manner as in Example 1. Using this Cellulose composite A, a protein enriched vegetable juice beverage was prepared as follows.

Cellulose composite A was dispersed by use of a TK homo mixer (MARKII manufactured by Tokushu Kika Kogyo Co., Ltd.) at 8,000 rpm for 10 minutes to prepare 10% by mass water dispersion A. Subsequently, a soybean protein (Prolena RD-1, manufactured by Fuji Oil Co., Ltd.) was dispersed by a TK homo mixer (MARKII, manufactured by Tokushu Kika Kogyo Co., Ltd.) at 8,000 rpm for 10 minutes to prepare 10% by mass water dispersion B.

To the water dispersion B, HM pectin (AYD-380D, manufactured by Unitec Foods Co., Ltd.) was added so as to satisfy the mass ratio of soybean protein/HM pectin of 5/1. The resultant mixture was dispersed by a TK homo mixer (MARKII, manufactured by Tokushu Kika Kogyo Co., Ltd.) at 8,000 rpm for 10 minutes to obtain water dispersion C.

To a commercially available vegetable juice (vegetable life 100, manufactured by KAGOME Co., Ltd.), water dispersion A (such that the concentration of a cellulose composite in a final beverage was set to 0.2% by mass) and water dispersion C (such that the concentrations of soybean protein in a final beverage was set to 0.5% by mass and the concentration of HM pectin was set to 0.1% by mass) were added. Subsequently, pure water was added and the mixture was dispersed by a TK homo mixer (MARKII, manufactured by Tokushu Kika Kogyo Co., Ltd.) at 8,000 rpm for 10 minutes to obtain water dispersion D.

The water dispersion D was treated by a high-pressure homogenizer (Manton-Gaulin Homogenizer manufactured by APV, pressure: 20 MPa) and sterilized in a hot bath of 85° C., while stirring by a propeller stirrer for 10 minutes to prepare a protein enriched vegetable juice beverage.

The beverage was evaluated in the same manner as in Example 1. The results are shown in Table 3.

Example 11

A protein enriched vegetable juice beverage was prepared in the same operation as in Example 10 such that the concentration of HM pectin in a final beverage was 0.05% by mass.

The beverage was evaluated in the same manner as in Example 1. The results are shown in Table 3.

Example 12

A protein enriched vegetable juice beverage was prepared in the same operation as in Example 10 such that the concentration of cellulose composite A in a final beverage was 0.1% by mass, the concentration of soybean protein was 1.0% by mass, and the concentration of HM pectin was 0.1% by mass.

The beverage was evaluated in the same manner as in Example 1. The results are shown in Table 3.

Example 13

In the same operation as in Example 10, the cellulose composite to be used was defined as cellulose composite M obtained in Example 7. Furthermore, a protein enriched vegetable juice beverage was prepared such that the concentration of cellulose composite M in a final beverage was 0.3% by mass and the concentration of a soybean protein was 0.5% by mass and the concentration of HM pectin was 0.2% by mass.

The beverage was evaluated in the same manner as in Example 1. The results are shown in Table 3.

Example 14

A protein enriched vegetable juice beverage was prepared in the same operation as in Example 10 such that the concentration of cellulose composite A in a final beverage was 0.2% by mass and the concentration of soybean protein was 0.5% by mass, and no HM pectin was added.

The beverage was evaluated in the same manner as in Example 1. The results are shown in Table 3.

Comparative Example 5

A protein enriched vegetable juice beverage was prepared in the same operation as in Example 10 such that the concentration of soybean protein was 0.5% by mass and the concentration of HM pectin was 0.2% by mass, and no cellulose composite was added.

The beverage was evaluated in the same manner as in Example 1. The results are shown in Table 3.

Comparative Example 6

In the same operation as in Example 10, the cellulose composite to be used was cellulose composite J obtained in Comparative Example 2. Furthermore, a protein enriched vegetable juice beverage was prepared such that the concentration of cellulose composite J in a final beverage was 0.2% by mass and the concentration of a soybean protein was 0.5% by mass and the concentration of HM pectin was 0.1% by mass.

The beverage was evaluated in the same manner as in Example 1. The results are shown in Table 3.

Example 15

Cellulose composite A was dispersed by a TK homo mixer (MARKII, manufactured by Tokushu Kika Kogyo Co., Ltd.) at 8,000 rpm for 10 minutes to prepare 10% by mass water dispersion. The water dispersion and a vegetable fruit juice milk beverage (commercially available product: "vegetable & soy milk" manufactured by ITO EN Ltd., composition: vegetable juice 25%, fruit juice 5%, soy milk 10%, vegetable protein 3.1 g/777 g) were dispersed by a TK homo mixer (MARKII, manufactured by Tokushu Kika Kogyo Co., Ltd.) at 8,000 rpm for 10 minutes and then, sterilized in a hot bath of 85° C., while stirring by a propeller stirrer for 10 minutes to prepare a vegetable fruit juice milk beverage.

The beverage was evaluated in the same manner as in Example 1. As a result, separation was evaluated as ⊚, sedimentation as ○, aggregation as ⊚ and viscosity as ⊚.

Comparative Example 7

In the same operation as in Example 15, the cellulose composite G obtained in Comparative Example 1 was used to prepare a vegetable fruit juice milk beverage.

The beverage was evaluated in the same manner as in Example 1. As a result, separation was evaluated as x (syneresis occurred in the upper liquid surface), sedimentation as Δ, aggregation as Δ and viscosity as ⊚.

Example 16

Cellulose composite A obtained in Example 1 and pure water were dispersed by a TK homo mixer (MARKII, manufactured by Tokushu Kika Kogyo Co., Ltd.) at 8,000 rpm for 10 minutes to obtain 5% by mass water dispersion. An aqueous sodium chloride solution (special grade, manufactured by Wako Pure Chemical Industries Ltd.) was added and again dispersed by a TK homo mixer (MARKII, manufactured by Tokushu Kika Kogyo Co., Ltd.) at 8,000 rpm for 10 minutes.

To the seasoning, dried bonito powder (dried bonito powder manufactured by YAMAKI Co., Ltd.) was added so as to satisfy a concentration of 0.5% by mass, stirred by a propeller stirrer and treated by a high-pressure homogenizer (Manton-Gaulin Homogenizer manufactured by APV, pressure: 20 MPa) to obtain a high salt concentration seasoning (the composition of the resultant seasoning was as follows: cellulose dispersion A: 1% by mass, sodium chloride concentration: 1.0 mol/L, dried bonito powder: 0.5% by mass and pH:6.6).

The appearance of the seasoning was evaluated in the same manner as in Example 1. As a result, separation was evaluated as ⊚, sedimentation as ⊚ and aggregation as ⊚.

Example 17

To the seasoning obtained in Example 16, glacial acetic acid was further added to control pH to be 4.5. The mixture was stirred by a propeller stirrer to obtain an acidic and high salt concentration seasoning (the composition of the resultant seasoning was: cellulose dispersion A: 1% by mass, sodium chloride concentration: 1.0 mol/L, dried bonito powder: 0.5% by mass and pH: 4.5).

The appearance of the seasoning was evaluated in the same manner as in Example 1. As a result, separation was evaluated as ⊚, sedimentation as ⊚ and aggregation as ⊚.

Comparative Example 8

In the same operation as in Example 16, the cellulose composite G obtained in Comparative Example 1 was used to obtain a high salt concentration seasoning (the composition of the resultant seasoning was: cellulose dispersion A: 1% by mass, sodium chloride concentration: 1.0 mol/L, dried bonito powder: 0.5% by mass and pH: 6.6).

The appearance of the seasoning was evaluated in the same manner as Example 1. As a result, separation was evaluated as x, sedimentation as x and aggregation as Δ.

Example 18

Wet cake like cellulose was prepared in the same manner as in Example 1, and gellan gum (GLG) was used as a hydrophilic gum in place of CSG to prepare a cellulose composite. The preparation method is as follows. MCC/GLG (deacyl-form gellan gum, trade name: Kelco gel manufactured by CP KELCO)/CMC-Na (F-7A manufactured by Dai-ichi Kogyo Seiyaku Co., Ltd., viscosity of 1% solution of 11 mPa·s) were weighed so as to satisfy a mass ratio of 90/5/5. To this mixture, water was added so as to satisfy a solid content of 50% by mass. The resultant mixture was kneaded by a planetary mixer to obtain cellulose composite N. The kneading energy was 0.6 kWh/kg. The kneading temperature, which was measured in the same manner as in Example 1, was 20 to 60° C. throughout the kneading and the achieving temperature was 50 to 60° C.

The storage elastic modulus (G') was 0.32 Pa and the volume average particle diameter was 6.5 μm. The colloidal cellulose component was 45% by mass and the particle L/D was 1.6. The dispersion stability was evaluated by using cellulose composite N in the same manner as in Example 1.

Furthermore, this cellulose composite N was used in the same manner as in Example 1 to prepare a calcium enriched vegetable fruit juice and suspension stability was evaluated. The results are shown in Table-1.

Example 19

Wet cake like cellulose was prepared in the same manner as in Example 1, xanthan gum was used as a hydrophilic gum in place of CSG to prepare a cellulose composite. The test production is as follows. MCC/xanthane gum (Bistop NSD-X manufactured by San-Ei Gen F.F.I., Inc.)/CMC-Na (F-7A manufactured by Dai-ichi Kogyo Seiyaku Co., Ltd., viscosity of 1% solution of 11 mPa·s) were weighed so as to satisfy a mass ratio of 90/2/8. To this mixture, water was added so as to satisfy a solid content of 48% by mass. The resultant mixture was kneaded by a planetary mixer to obtain cellulose composite 0. The kneading energy was 0.6 kWh/kg. The kneading temperature, which was measured in the same manner as in Example 1, was 20 to 60° C. throughout the kneading and the achieving temperature was 50 to 60° C.

The storage elastic modulus (G') was 0.35 Pa and the volume average particle diameter was 6.3 µm. The colloidal cellulose component was 49% by mass and the particle L/D was 1.6. The dispersion stability was evaluated by using cellulose composite 0 in the same manner as in Example 1.

Furthermore, this cellulose composite 0 was used in the same manner as in Example 1 to prepare a calcium enriched vegetable fruit juice and suspension stability was evaluated. The results are shown in Table-1.

Comparative Example 9

Commercially available wood pulp (average polymerization degree=1720, α-cellulose content=78% by mass) was cut into 6×16 mm rectangular chips, then water was added so as to obtain a solid content concentration of 80% by mass. This was passed once through a cutter mill (interval between cutting head and horizontal blade: 2.03 mm, impeller rotation number: 3600 rpm) so as not to separate water and pulp chips as carefully as possible. The materials treated by the cutter mill and water were weighed so as to satisfy a cellulose concentration of 1.5% by mass and stirred until entangled fibers were released. The resultant water dispersion was treated by grind stone rotation type pulverizer (grinder rotation number: 1800 rpm) twice while changing a grinder clearance from 110 to 80 µm. Subsequently, the resultant water dispersion was directly passed through a high-pressure homogenizer (treatment pressure: 55 MPa) 18 times to obtain cellulose slurry. When this cellulose slurry was observed by a scanning electron microscope, extremely micro fibrous cellulose having a major axis/minor axis ratio of 30 to 300 was observed.

To the micro fibrous cellulose slurry obtained above, carboxymethylcellulose sodium (1% by mass aqueous solution, viscosity: about 3400 mPa·s) and dextrin (DE: about 23) were added such that the ratio of cellulose:carboxymethylcellulose sodium (water soluble gum):dextrin (hydrophilic substance) was 70:18:12 (parts by mass). The mixture (15 kg) was stirred and mixed by a stirring-type homogenizer ("T. K. AUTO HOMO MIXER" manufactured by Tokushu Kika Kogyo Co., Ltd.) at 8000 rpm for 30 minutes to obtain a cellulose solution mixture. Subsequently, the solution mixture was casted by an applicator on an aluminum board to a thickness of 2 mm, dried by a hot air dryer at 120° C. for 45 minutes to obtain a film. This film was pulverized by a cutter mill (manufactured by Fuji Paudal Co., Ltd.) into pieces, to a extent that can pass through a sieve having an opening of 1 mm to obtain a cellulose dry composition.

Subsequently, a stabilizer is prepared which contains the cellulose dry composition and psyllium seed gum (the same hydrophilic gum as used in Example 1) in a mass ratio of 9:1. The stabilizer and water were weighed so as to obtain a water dispersion having a solid content of 1% by mass and dispersed by a "T.K. homo mixer" (manufactured by Tokushu Kika Kogyo Co., Ltd.) at 8,000 rpm for 10 minutes to obtain cellulose composition P (this composition was a mixture not a composite). The kneading energy (stirring energy by T.K. homo mixer) was, in total, less than 0.005 kWh/kg. The kneading (stirring by the T.K. homo mixer) temperature in the coexistence with a hydrophilic gum, which was measured in the same manner as in Example 1, and it was 20 to 60° C. during the kneading and the achieving temperature was 50 to 60° C.

The volume average particle diameter was 37.9 µm and the colloidal cellulose component was 75% by mass. As a result of measuring storage elastic modulus in the same operation as in Example 1, it was 22 Pa. The dispersion stability of cellulose composition P was evaluated in the same manner as in Example 1.

Furthermore, using this cellulose composition P, a calcium enriched vegetable fruit juice was prepared in the same manner as in Example 1 and the suspension stability thereof was evaluated. The results are shown in Table-2. As a result, since cellulose composition P had a very thin and long particle shape and G' was extremely high, the components of the resultant beverage were aggregated, viscosity was very high and the feeling of the beverage in the throat became bad.

Note that the addition concentration of cellulose composition P was set to 0.03% by mass in order to obtain the same beverage viscosity as in each of Examples to prepare a beverage having viscosity of 10 mPa·s or less as a test product in the same operation as in Example 1. As a result, separation and viscosity were evaluated as ⊚; however, aggregation was evaluated as x.

Example 20

A wet cake like cellulose was prepared in the same manner as in Example 1 and a cellulose composite was prepared by using CSG as a hydrophilic gum and CMC-Na as a water soluble gum. A test production was as follows. MCC/CSG (psyllium seed husk food made manufactured by Shikibo Ltd. A 1% solution has a viscosity of 198 mPa·s)/CMC-Na (F-7A manufactured by Dai-ichi Kogyo Seiyaku Co., Ltd., viscosity of 1% solution: 11 mPa·s) were weighed so as to have a mass ratio of 90/5/5. To this mixture, water was added so as to have a solid content of 37% by mass. The mixture was kneaded by a planetary mixer to obtain cellulose composite Q. The kneading energy was 0.05 kWh/kg (operation conditions of the planetary mixer were the same as in Example 1 and the kneading energy was controlled depending upon the operation time). The kneading temperature, which was measured in the same manner as in Example 1, was 20 to 60° C. throughout the kneading and the achieving temperature was 50 to 60° C.

The storage elastic modulus (G') was 0.06 Pa and the volume average particle diameter was 8.2 µm. The colloidal cellulose component was 38% by mass and the particle L/D was 2.2. The dispersion stability was evaluated by using cellulose composite Q in the same manner as in Example 1.

Furthermore, this cellulose composite Q was used in the same manner as in Example 1 to prepare a calcium enriched vegetable fruit juice and suspension stability was evaluated. The results are shown in Table-1.

Example 21

A wet cake like cellulose was prepared in the same manner as in Example 1 and a cellulose water dispersion was prepared in the conditions that the mass ratio of MCC/CSG/CMC-Na is 90/5/5 and solid content is 40% by mass. This cellulose water dispersion was kneaded by the same apparatus as in Example 1. The kneading temperature was controlled by supplying hot water (50° C.) in the jacket of the kneading container to obtain cellulose composite R. The kneading time was extended from that of Example 1 and the total kneading energy was 0.50 kWh/kg. The kneading temperature, which was measured in the same manner as in Example 1, was 20 to 80° C. throughout the kneading and the achieving temperature was 70 to 80° C. The storage elastic modulus (G') was 0.13 Pa and the volume average particle diameter was 6.3 μm. The colloidal cellulose component was 55% by mass and the particle L/D was 2.0. The dispersion stability was evaluated by using cellulose composite R in the same manner as in Example 1.

Furthermore, this cellulose composite R was used in the same manner as in Example 1 to prepare a calcium enriched vegetable fruit juice and suspension stability was evaluated. The results are shown in Table-1.

[Evaluation of Viscoelasticity Measurement]

The measurement results of viscoelasticity of cellulose composite A (Example 1) and cellulose composite K (Comparative Example 3) are shown in FIGS. 1 and 2.

From FIG. 1, it is found that an acidic water dispersion of cellulose composite A has a high storage elastic modulus at a point near a strain of 20%, compared to that of the pure water dispersion (pure water: 0.02 Pa→pH 4:0.58 Pa). Furthermore, from FIG. 2, it is found that an acidic water dispersion of cellulose composite K (cellulose composite obtained in accordance with the process of Examples of Patent Literature 3) has a low storage elastic modulus at a point near a strain of 20%, compared to that of the pure water dispersion (pure water: 0.24 Pa→pH 4:0.01 Pa).

In the cellulose composite obtained by kneading by applying conventional energy, the storage elastic modulus in an acidic or high salt concentration state is lower than those in pure water, thus suspension stability becomes lower. In contrast, for the cellulose composite obtained by kneading by applying high energy, the storage elastic modulus in an acidic or high salt concentration state is high, thus the suspension stability is improved.

TABLE 1

| | | Example | | | | | | |
|---|---|---|---|---|---|---|---|---|
| | | 1 | 2 | 3 | 4 | 5 | 6 | 7 |
| Cellulose composite | | A | B | C | D | E | F | M |
| Composition (mass ratio) | Cellulose | 90 | 90 | 90 | 50 | 95 | 90 | 90 |
| | CSG | 5 | 3 | 9 | 25 | 2.5 | 10 | 5 |
| | Gellan gum | — | — | — | — | — | — | — |
| | Xanthan gum | — | — | — | — | — | — | — |
| | Water-soluble gum | 5 | 7 | 1 | 25 | 2.5 | 0 | 5 |
| | (Type of water-soluble gum) | (Carboxymethylcellulose Na) | (Carboxymethylcellulose Na) | (Gellan gum) | (Carboxymethylcellulose Na) | (Sodium alginate) | (Carboxymethylcellulose Na) | (LM pectin) |
| Hydrophilic gum/water soluble gum ratio | | 50/50 | 30/70 | 90/10 | 50/50 | 50/50 | 100/0 | 50/50 |
| Kneading energy [kWh/kg] | | 0.60 | 0.10 | 0.50 | 0.60 | 0.60 | 0.50 | 0.50 |
| Physical value of cellulose composite | Volume average particle diameter [μm] | 6.2 | 6.8 | 7.5 | 5.8 | 7.8 | 7.4 | 7.2 |
| | Colloidal cellulose content [% by mass] | 55 | 45 | 53 | 36 | 43 | 56 | 54 |
| | Storage elastic modulus (G') [Pa] | 0.48 | 0.20 | 0.18 | 0.20 | 0.50 | 0.15 | 0.17 |
| | Particle L/D | 1.6 | 2.0 | 1.6 | 1.6 | 1.6 | 1.6 | 1.6 |
| | Separation | ◎ | ◎ | ◎ | ◎ | ◎ | ○ | ◎ |
| | Aggregation | ◎ | ◎ | ◎ | ◎ | ◎ | ◎ | ◎ |
| | Sedimentation | ◎ | ◎ | ◎ | ◎ | ◎ | ◎ | ◎ |
| | Viscosity | ◎ | ◎ | ◎ | ◎ | ◎ | ◎ | ◎ |
| Type of beverage evaluated | | Vegetable fruit juice | | | | | | |
| Functional food material enriched | | Milk calcium | | | | | | |
| Evaluation results of beverage | Separation | ◎ | ○ | ◎ | ◎ | ◎ | Δ | ○ |
| | Aggregation | ◎ | ○ | ◎ | ○ | ◎ | ○ | ○ |
| | Sedimentation | ◎ | ○ | ◎ | ○ | ◎ | ○ | ○ |
| | Viscosity | ◎ | ◎ | ◎ | ◎ | ○ | ◎ | ○ |

| | | Example | | | | | |
|---|---|---|---|---|---|---|---|
| | | 8 | 9 | 18 | 19 | 20 | 21 |
| Cellulose composite | | A | A | N | O | Q | R |
| Composition (mass ratio) | Cellulose | 90 | 90 | 90 | 90 | 90 | 90 |
| | CSG | 5 | 5 | — | — | 5 | 5 |
| | Gellan gum | — | — | 5 | — | — | — |
| | Xanthan gum | — | — | — | 2 | — | — |
| | Water-soluble gum | 5 | 5 | 5 | 8 | 5 | 5 |
| | (Type of water-soluble gum) | (Carboxymethylcellulose Na) | (Carboxymethylcellulose Na) | (Carboxymethylcellulose Na) | (Carboxymethylcellulose Na) | (Carboxymethylcellulose Na) | (Carboxymethylcellulose Na) |
| Hydrophilic gum/water soluble gum ratio | | 50/50 | 50/50 | 50/50 | 20/80 | 50/50 | 50/50 |

TABLE 1-continued

|  |  |  |  |  |  |  |  |
|---|---|---|---|---|---|---|---|
| Kneading energy [kWh/kg] |  | 0.60 | 0.60 | 0.60 | 0.60 | 0.05 | 0.50 |
| Physical value of cellulose composite | Volume average particle diameter [µm] | 6.2 | 6.2 | 6.5 | 6.3 | 8.2 | 6.3 |
|  | Colloidal cellulose content [% by mass] | 55 | 55 | 45 | 49 | 38 | 55 |
|  | Storage elastic modulus (G') [Pa] | 0.48 | 0.48 | 0.32 | 0.35 | 0.06 | 0.13 |
|  | Particle L/D | 1.6 | 1.6 | 1.6 | 1.6 | 2.2 | 2.0 |
|  | Separation | ◎ | ◎ | ○ | ○ | Δ | Δ |
|  | Aggregation | ◎ | ◎ | ◎ | ◎ | ○ | ◎ |
|  | Sedimentation | ◎ | ◎ | ◎ | Δ | ○ | ○ |
|  | Viscosity | ◎ | ◎ | ◎ | Δ | ◎ | ◎ |
| Type of beverage evaluated |  | Sports drink | Vegetable fruit juice | Vegetable fruit juice | Vegetable fruit juice | Vegetable fruit juice | Vegetable fruit juice |
| Functional food material enriched |  | Milk calcium | β-glucan | Milk calcium | Milk calcium | Milk calcium | Milk calcium |
| Evaluation results of beverage | Separation | ◎ | ◎ | Δ | ◎ | Δ | Δ |
|  | Aggregation | ◎ | ◎ | ○ | Δ | ○ | ○ |
|  | Sedimentation | ◎ | ◎ | Δ | ○ | Δ | Δ |
|  | Viscosity | ◎ | ◎ | ◎ | Δ | ◎ | ◎ |

TABLE 2

|  |  | Comparative Example |  |  |  |  |
|---|---|---|---|---|---|---|
|  |  | 1 | 2 | 3 | 4 | 9 |
| Cellulose composite/cellulose composition* |  | G | J | K | L | P* |
| Composition (mass ratio) | Cellulose | 80 | 90 | 80 | 90 | 63 |
|  | CSG | 0 | 5 | 0 | 5 | 10 |
|  | Water-soluble gum | 20 | 5 | 20 | 5 | 16.2 |
|  | (Type of water-soluble gum) | (Carboxymethyl-cellulose Na) | (Carboxymethyl-cellulose Na) | (Carboxymethyl-cellulose Na) | (Carboxymethyl-cellulose Na) | (Carboxymethyl-cellulose Na) |
| Hydrophilic gum/water soluble gum ratio |  | 0/100 | 50/50 | 0/100 | 50/50 | 10/16.2 |
| Kneading energy [kWh/kg] |  | 0.50 | 0.04 | 0.03 | less than 0.005 | less than 0.005 |
| Physical value of cellulose composite | Volume average particle diameter [µm] | 8.8 | 13.5 | 3.4 | 3.5 | 39 |
|  | Colloidal cellulose content [wt %] | 35 | 28 | 40 | 72 | 75 |
|  | Storage elastic modulus (G') [Pa] | 0.02 | 0.01 | 0.01 | 0.01 | 22 |
|  | Particle L/D | 1.6 | 2.4 | 2.4 | 1.6 | 160 |
|  | Separation | ○ | X | X | X | ◎ |
|  | Aggregation | Δ | X | X | X | ◎ |
|  | Sedimentation | Δ | ○ | Δ | Δ | ◎ |
|  | Viscosity | ◎ | ◎ | ○ | ◎ | X |
| Type of beverage evaluated |  | Vegetable fruit juice |  |  |  |  |
| Functional food material enriched |  | Milk calcium |  |  |  |  |
| Evaluation results of beverage | Separation | X | X | X | X | ◎ |
|  | Aggregation | X | X | X | X | X |
|  | Sedimentation | X | ○ | Δ | Δ | ◎ |
|  | Viscosity | ◎ | ◎ | ○ | ○ | X |

TABLE 3

|  |  | Example |  |  |  |  | Comparative Example |  |
|---|---|---|---|---|---|---|---|---|
|  |  | 10 | 11 | 12 | 13 | 14 | 5 | 6 |
| Type of cellulose composite |  | A | A | A | M | A | — | J |
| Composition | Cellulose composite (% by mass) | 0.2 | 0.2 | 0.1 | 0.3 | 0.2 | 0 | 0.2 |
|  | Soybean protein (% by mass) | 0.5 | 0.5 | 1 | 0.5 | 0.5 | 0.5 | 0.5 |
|  | HM pectin (% by mass) | 0.1 | 0.05 | 0.1 | 0.2 | 0 | 0.2 | 0.1 |
| Evaluation results of beverage | Separation | ◎ | ○ | ○ | ○ | Δ | X | X |
|  | Aggregation | ◎ | ◎ | ◎ | ◎ | Δ | X | Δ |
|  | Sedimentation | ◎ | ◎ | ○ | ○ | ◎ | X | X |
|  | Viscosity | ◎ | ◎ | ○ | ○ | ○ | ◎ | ◎ |

INDUSTRIAL APPLICABILITY

The present invention is useful for enhancing commercial value by suppressing occurrence of separation, aggregation and sedimentation to attain dispersion stability and suspension stability in a food and drink containing a cellulose composite and having pH 5 or less or a salt concentration of 0.01 mol/L or more. Particularly, the present invention is useful for exhibiting excellent suspension stability in a food and drink containing a water-insoluble component such as a functional food material.

The invention claimed is:

1. A process for producing a cellulose composite comprising cellulose and a hydrophilic gum, comprising a step of kneading a kneading mixture of the cellulose and the hydrophilic gum wherein the mixture has a solid content concentration of 20% by mass or more with a kneading energy of 50 Wh/kg or more, wherein the cellulose composite has a storage elastic modulus (G') of 0.06 Pa or more in a water dispersion of pH 4 which contains the cellulose composite in an amount of 1% by mass.

2. A cellulose composite obtained by the process according to claim 1.

* * * * *